US008122292B2

(12) United States Patent
Nanjundaswamy

(10) Patent No.: US 8,122,292 B2
(45) Date of Patent: Feb. 21, 2012

(54) DEBUGGING OF BUSINESS FLOWS DEPLOYED IN PRODUCTION SERVERS

(75) Inventor: Vijay Kyathanahalli Nanjundaswamy, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 11 days.

(21) Appl. No.: 12/648,310

(22) Filed: Dec. 29, 2009

(65) Prior Publication Data
US 2011/0047415 A1  Feb. 24, 2011

Related U.S. Application Data

(60) Provisional application No. 61/235,351, filed on Aug. 19, 2009.

(51) Int. Cl.
  *G06F 11/00* (2006.01)
(52) U.S. Cl. .......................... 714/34; 717/129
(58) Field of Classification Search ................ 714/34
  See application file for complete search history.

(56) References Cited

U.S. PATENT DOCUMENTS

| | | | |
|---|---|---|---|
| 5,140,671 A | 8/1992 | Hayes et al. | |
| 6,044,305 A * | 3/2000 | Larson et al. | 700/87 |
| 6,275,956 B1 | 8/2001 | On et al. | |
| 7,162,664 B2 * | 1/2007 | Haselden et al. | 714/34 |
| 7,464,366 B2 | 12/2008 | Shukla et al. | |
| 7,472,378 B2 * | 12/2008 | Bennett et al. | 717/129 |
| 7,519,960 B2 * | 4/2009 | Mei et al. | 717/129 |
| 7,607,124 B2 * | 10/2009 | Gooty et al. | 717/129 |
| 7,849,188 B2 * | 12/2010 | Yu | 709/224 |
| 2002/0199173 A1 | 12/2002 | Bowen | |
| 2004/0168155 A1 * | 8/2004 | O'Farrell et al. | 717/129 |
| 2005/0091093 A1 * | 4/2005 | Bhaskaran et al. | 705/7 |
| 2005/0177820 A1 * | 8/2005 | Mei et al. | 717/129 |
| 2005/0273757 A1 * | 12/2005 | Anderson | 717/100 |
| 2006/0095274 A1 | 5/2006 | Phillips et al. | |
| 2006/0174225 A1 | 8/2006 | Bennett et al. | |
| 2006/0190926 A1 * | 8/2006 | Bennett et al. | 717/114 |
| 2006/0190929 A1 * | 8/2006 | Bennett et al. | 717/124 |
| 2007/0157174 A1 | 7/2007 | Gebhardt et al. | |
| 2007/0165625 A1 * | 7/2007 | Eisner et al. | 370/389 |
| 2007/0168301 A1 * | 7/2007 | Eisner et al. | 705/79 |
| 2007/0171923 A1 * | 7/2007 | Eisner et al. | 370/401 |
| 2007/0171924 A1 * | 7/2007 | Eisner et al. | 370/401 |
| 2007/0180150 A1 * | 8/2007 | Eisner et al. | 709/246 |
| 2007/0240125 A1 * | 10/2007 | Degenhardt et al. | 717/129 |
| 2007/0260929 A1 * | 11/2007 | Liu et al. | 714/38 |
| 2008/0059964 A1 | 3/2008 | Khodabakchian et al. | |
| 2008/0071595 A1 * | 3/2008 | Chang et al. | 705/7 |
| 2009/0150870 A1 * | 6/2009 | Bates | 717/129 |
| 2010/0199260 A1 * | 8/2010 | Duggal et al. | 717/106 |

OTHER PUBLICATIONS

Fernandez M.G. and Ghosh, S. , Abstract of "DDBX-LPP: A Dynamic Software Tool for Debugging Asynchronousdistributed Algorithms on Loosely-Coupled Parallel Processors", IEEE International Conference on Systems, Man, and Cybernetics, vol. 1, Publication Date: Oct. 13-16, 1991, pp. 639-644.

(Continued)

*Primary Examiner* — Scott Baderman
*Assistant Examiner* — Kamini Patel
(74) *Attorney, Agent, or Firm* — Narendra Reddy Thappeta

(57) ABSTRACT

Facilitating debugging of business flows deployed on a production server. An aspect of the present invention processes some service requests (received from a client system) in a normal mode and some other service requests in a debug mode concurrently, all according to a business flow. According to another aspect, the debug mode supports a single step debug operation, in which each step corresponds to a single activity of the business flow. Accordingly, an administrator of the production server is enabled to better determine, the problems in the execution of business flows deployed on a production server at runtime.

31 Claims, 19 Drawing Sheets

OTHER PUBLICATIONS

"Roland Wismüller", Abstract and First Page of "Debugging Message Passing Programs Using Invisible Message Tags", Book Series: Lecture Notes in Computer Science, Springer Berlin / Heidelberg, Volume: vol. 1332, Copyrighted Date: 1997, pp. 295-302.

"Roland Wismüller et. al.", Abstract of "Interactive Debugging and Performance Analysis of Massively Parallel Applications", ScienceDirect—Parallel Computing, vol. 22, Issue: 3, Publication Date: Mar. 1996, pp. 415-442.

Oasis Wsbpel Technical Committee, "OASIS BPEL 2.0 Primer", OASIS Standard, Publication Date: Apr. 11, 2007, pp. 1-264.

* cited by examiner

BPEL Process Console — 500

| Dashboard | Processes | Instances | Activities | | Configuration | Administration |

Search Processes

Process Name: [____]

State: [Any ▼]

Lifecycle: [Any ▼]

(Go)

Related Tasks

Deploy New Process — 518

Deployed Processes — 515

| | BPEL Process | Lifecycle | State | Open Instances | Closed Instances |
|---|---|---|---|---|---|
| ☐ | AmericanLoan (v.1.0) | Active | On | 0 | 16 |
| ☐ | Async2 (v.1.0) | Retired | On | 0 | 2 |
| ☐ | AsyncHelloWorldProcess (v.1.0) | Active | On | 1 | 37 |
| ☐ | BPELProcess2 (v.v2008_10_07_38846) | Active | On | 1 | 25 |
| ☐ | FlowSample (v.v2009_05_04_72888) | Active | On | 0 | 1 |
| ☐ | FlowSample (v.v2009_05_04_73109)* | Active | On | 0 | 2 |
| ☐ | HomeLoanProcessing (v.v2008_12_03_56180) | Active | On | 0 | 1 |
| ☐ | HomeLoanProcessing (v.v2009_04_08_61797)* | Active | On | 0 | 3 |
| ☐ | HomeLoanProcessing (v.v2009_15_03_51736) | Active | On | 1 | 2 |
| ☐ | ParseEscapedXMLProcess (v.1.0) | Active | On | 0 | 8 |
| ☐ | RapidDistributors (v.1.0) | Active | On | 0 | 7 |
| ☐ | SelectManufacturing (v.1.0) | Active | On | 1 | 6 |

Check All – Clear All
(Bulk Update)

| ActivityId | Activity Name | Type | State |
|---|---|---|---|
| BpRcv0 | receiveLoanRequest | User-specified | Open |
| BpFlw0 | GetLoanQuotes | User-specified | Open |

721 → BpRcv0
722 → BpFlw0

| ActivityId | Activity Name | Type | State |
|---|---|---|---|
| BpRcv0 | receiveLoanRequest | User-specified | Open |
| BpFlw0 | GetLoanQuotes | User-specified | Open |
| BpInv3 | callBackClient | User-specified | Open |

721 → BpRcv0
722 → BpFlw0
723 → BpInv3

| ActivityId | Activity Name | Type | State |
|---|---|---|---|
| BpRcv0 | receiveLoanRequest | User-specified | Closed |
| BpFlw0 | GetLoanQuotes | User-specified | Open |
| BpInv3 | callBackClient | User-specified | Open |

731 → BpRcv0
732 → BpFlw0
733 → BpInv3

| | ActivityId 711 | Activity Name 712 | Type 713 | State 714 |
|---|---|---|---|---|
| 741 → | BpRcv0 | receiveLoanRequest | User-specified | Closed |
| 742 → | BpFlw0 | GetLoanQuotes | User-specified | Open |
| 743 → | BpInv3 | callBackClient | User-specified | Open |
| 744 → | BpScp0 | GetCreditRating | Internal | Open |

FIG. 7E

| | ActivityId 711 | Activity Name 712 | Type 713 | State 714 |
|---|---|---|---|---|
| 761 → | BpRcv0 | receiveLoanRequest | User-specified | Closed |
| 762 → | BpFlw0 | GetLoanQuotes | User-specified | Open |
| 763 → | BpInv3 | callBackClient | User-specified | Open |
| 764 → | | | | |

FIG. 9A

| ActivityId | Activity Name | State |
|---|---|---|
| BpRcv0 | receiveLoanRequest | Open |

| ActivityId | Activity Name | State |
|---|---|---|
| | | |

| ActivityId | Activity Name | State |
|---|---|---|
| BpScp0 | GetCreditRating | Open |

← 961

650

911 912 913

DEBUGGING OF BUSINESS FLOWS DEPLOYED IN PRODUCTION SERVERS

RELATED APPLICATIONS

The present application is related to and claims priority from the U.S. provisional patent application entitled "Debugging Of Business Flows Executing In Production Servers", application Ser. No. 61/235,351, filed on 19 Aug. 2009, naming as inventor Vijay Kyathanahalli Nanjundaswamy as in the subject patent application, and is incorporated in its entirety herewith.

BACKGROUND OF THE INVENTION

1. Technical Field

The present disclosure relates to server technologies and more specifically to debugging of business flows deployed in productions servers.

2. Related Art

Servers refer to computer systems which receive requests from various client systems, and provide corresponding responses by processing each request based on a corresponding processing logic. A server that is presently deployed in a production environment and actively processing service requests is termed as a production server. Production servers are contrasted from testing and staging servers, which are used in testing and evaluation environments respectively.

The processing logic in production servers is often specified in the form of business flows. A business flow contains activities, which are specified at a high level of abstraction compared to programming languages such as C, C++, Java, etc. (lower level languages). In an embodiment, the high level activities are converted to lower level instructions (e.g., in Java language) and then executed by a flow engine. The flow engine is shared by many flows, and thus provides the runtime environment to process each activity of a flow, as is well known in the relevant arts.

Such environments are thus conducive to high level business people (e.g., analysts as compared to programmers) to specify the desired processing logic, without having to address many of the lower level implementation details.

There is a general need to facilitate debugging of such business flows deployed in production servers. As is well known, debugging refers to providing additional visibility into various internal states during execution such that a user may determine a cause of a problem. Thus, debugging with respect to business flows is generally required when a problem is deemed to be present with respect to the processing logic underlying the business flows. Various aspects of the present invention provide such a feature, as described below in detail with examples.

BRIEF DESCRIPTION OF THE DRAWINGS

Example embodiments of the present invention will be described with reference to the accompanying drawings briefly described below.

FIGS. 5A-5H together illustrates the manner in which debugging (in particular single step debugging) of a business flow deployed in a process server is facilitated in one embodiment.

FIGS. 7A-7E together depict the content of instance breakpoint table at different time instances in one embodiment.

FIGS. 9A-9C together depict the content of a single-step table at different time instances in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

Figure 1:
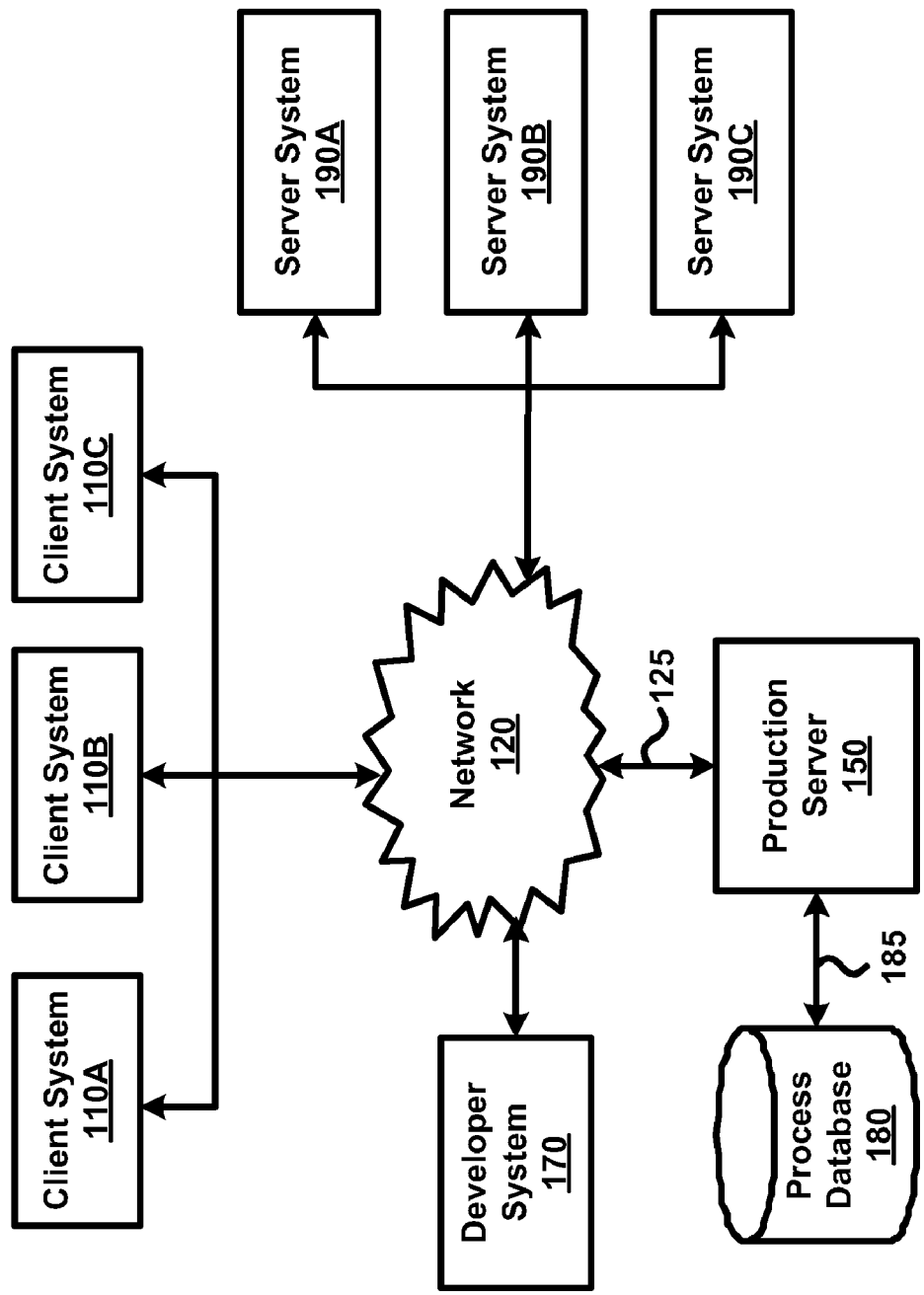
FIG. 1 is a block diagram illustrating an example environment (computing system) in which several aspects of the present invention can be implemented.

An aspect of the present invention allows some service requests to be processed in a normal mode, while concurrently allowing other service requests to be processed in a debug mode, all according to a business flow. Concurrently implies that processing in both modes is performed simultaneously, without having to configure (a flow engine) for operation in only one of the two modes exclusively. Accordingly, an administrator of the production server is enabled to better determine the problems in (the processing logic of) the business flow with respect to processing of some service requests while allowing other service requests to be processed in a normal mode.

According to another aspect, the debug mode supports single step debug operation, in which each step corresponds to a single activity of the business flow. Thus, processing of a service request is paused before start of execution of each activity in the business flow until a user input to continue execution is received. The processing continues with execution of the next activity in an execution path of the business flow. Such single-stepping provides more visibility along the execution path of the business flow, with the steps logically corresponding to a granularity convenient for users in corresponding environments.

In an embodiment, the operation in debug mode is facilitated using breakpoints. A breakpoint is an interception point in the business flow, where execution is paused until further user action. The user action may specify single step operation to cause breaks after execution of each activity. In single-step debug operation, processing of a service request is paused before start of execution of each activity in the business flow until a user input to continue execution is received. The user may alternatively set breakpoints manually and specify a resume operation to execute a sequence of activities (until the next set breakpoint is reached in the execution path).

According to yet another aspect of the present invention, a user specifies breakpoints at specific points of a business flow. Each service request is processed in a corresponding instance, and an instance enters debug mode if a breakpoint is encountered in the execution path. If no breakpoint is encountered, processing of the corresponding service request is completed in normal mode.

According to one more aspect of the present invention, a flow engine (part of a run-time environment executing the different business flows) in the production server is extended to support real-time debugging. In one embodiment, an activity execution block contained in the flow engine withholds tokens to activity blocks that have a breakpoint. In single-step execution, there is an implicit breakpoint on the next activity to be performed. An activity block is designed to execute an activity only on the availability of a corresponding token from the activity execution block. The activity execution block withholds a token for an activity that has a breakpoint until reception of a continue indication from a user, when the business flow is executed in a debug mode, and issues token for an activity when the business flow is executed in a normal mode.

According to another aspect of the present invention, the same sequence of procedures within the activity blocks (representing a business flow in compiled form) are executed irrespective of whether processing of a service request enters debug mode or not. According to one more aspect of the present invention, no additional instructions or changes are needed within such activity blocks for making use of debug features.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing client systems 110A-110C, network 120, production server 150, developer system 170, process database 180 and server systems 190A-190C.

Merely for illustration, only representative number/type of systems is shown in FIG. 1. Many environments often contain many more systems, both in number and type, depending on the purpose for which the environment is designed. Each system/device of FIG. 1 is described below in further detail.

Network 120 provides connectivity between client systems 110A-110C, production server 150, developer system 170 and server systems 190A-190C. Network 120 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Each of client systems 110A-110C represents a system such as a personal computer, workstation, mobile station, etc., used by users to generate service requests directed to business flows deployed in production server 150. The service requests (necessitating performance of specific flows) may be generated using appropriate user interfaces. In general, a client system sends requests for performing desired tasks according to a business flow, and receives corresponding responses containing the results of processing by the business flow.

Process database 180 represents a non-volatile, persistent storage facilitating storage and retrieval of the state of long-running business flows executing in production server 150. The data used by the business flows may also be stored in process database 180. Process database 180 may be implemented as a relational database system and therefore provide storage and retrieval of data using structured queries such as SQL (Structured Query Language). Alternatively, process database 180 may be implemented as a file system providing storage and retrieval of data in the form of one or more files organized as one or more directories, as is well known in the relevant arts.

Each of server systems 190A-190C represents a server such as a web/application server executing enterprise applications designed to perform business functions required for some of the activities specified in business flows. The business functions may be exposed by the enterprise applications as corresponding web services.

As is well known, a web service refers to business function available on the Internet, making known its intended function, communicating using open protocols such as SOAP/HTTP and ready to be used by others in their application. The business functions thus exposed by the enterprise applications may be accessed and their services utilized by web service consumers/clients (such as the business flows executing in production server 150). The web service interface definition may be provided using the standard Web Service Description Language (WSDL).

It should be appreciated that server systems 190A-190C can also generate service requests, similar to client systems 110A-110C, for processing according to the business flows in production server 150.

Developer system 170 represents a system used by a developer/business process modeler (e.g. a business analyst) to create/edit new/existing business flows and to deploy the business flows (for execution) in production server 150. The source code or a compiled form of the business flow may be deployed in production server 150 to process the service requests received from client/server systems. In one embodiment, business flows are specified using a Web Services Business Process Execution Language (commonly abbreviated as BPEL), which is a process orchestration language using XML format. As is well known, BPEL enables business flows to be built on Web service standards (such as WSDL, SOAP, etc.) for process automation and enables composition of discrete web services into an end-to-end business flow.

Production server 150 represents a server system actively processing service requests received from client systems 110A-110C (and also server systems 190A-190C). As noted above, the service requests are processed according to business flows executing in the context of a flow engine, which is a part of a common run time environment in the production server, shared by several flows. Production server 150 processes the service requests by execution of appropriate business flows (which may cause modification of data stored internally or externally such as in process database 180) to generate corresponding responses, and sends the responses to the requesting client systems. Some of the activities of the executed business flows may be implemented as invocations to one or more web services exposed by server systems 190A-190C.

It may be desirable to facilitate (for example, an administrator/business analyst) debugging of business flows deployed in production server 150. Production server 150, provided according to several aspects of the present invention, facilitates debugging of business flows as described below with examples.

3. Debugging Business Flows

Figure 2A:
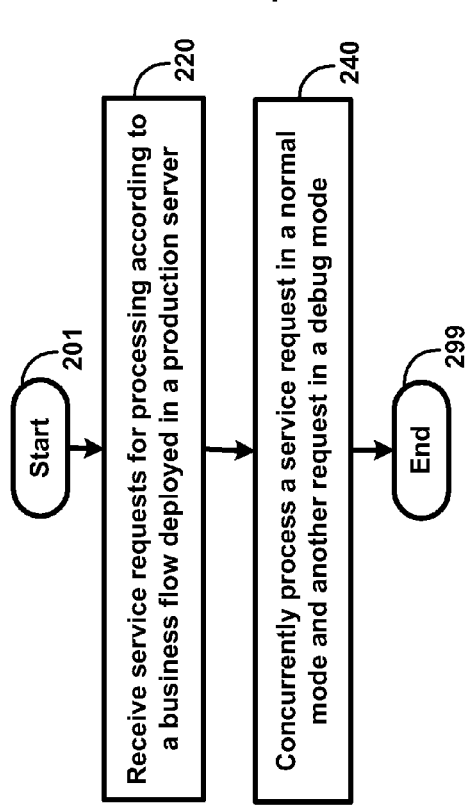
FIG. 2A is a flow chart illustrating the manner in which debugging of business flows deployed in a production server is facilitated according to an aspect of the present invention.

FIG. 2A is a flow chart illustrating the manner in which debugging of business flows deployed in a production server is facilitated according to an aspect of the present invention. The flowchart is described with respect to production server 150 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, production server 150 receives service requests for processing according to a business flow deployed in the server. The service requests may be received from users using one of client systems 110A-110C (or server systems 190A-190C).

In step 240, production server 150 concurrently processes a first set of (one or more) service requests in normal mode and a second set of service requests in debug mode according to the business flow. A service request is said to be processed in debug mode when the processing is paused by the run time environment due to presence of a breakpoint in the execution path. On the other hand, when a service request is processed without such pausing for debugging purpose (due to the absence of a breakpoint in the execution path), a service request is said to be processed in normal mode.

Concurrent processing implies that both the sets of service requests are processed in parallel. As an illustration, assuming that an instance is in debug mode between time points t1 and t2, and another instance is in normal mode between time points t3 and t4, the two durations (t1-t2) and (t3-t4) overlap. In other words, service requests continue being processed in normal mode, while some other service requests are paused for debugging purpose in such an overlapping duration as described below with examples.

Figure 2B:
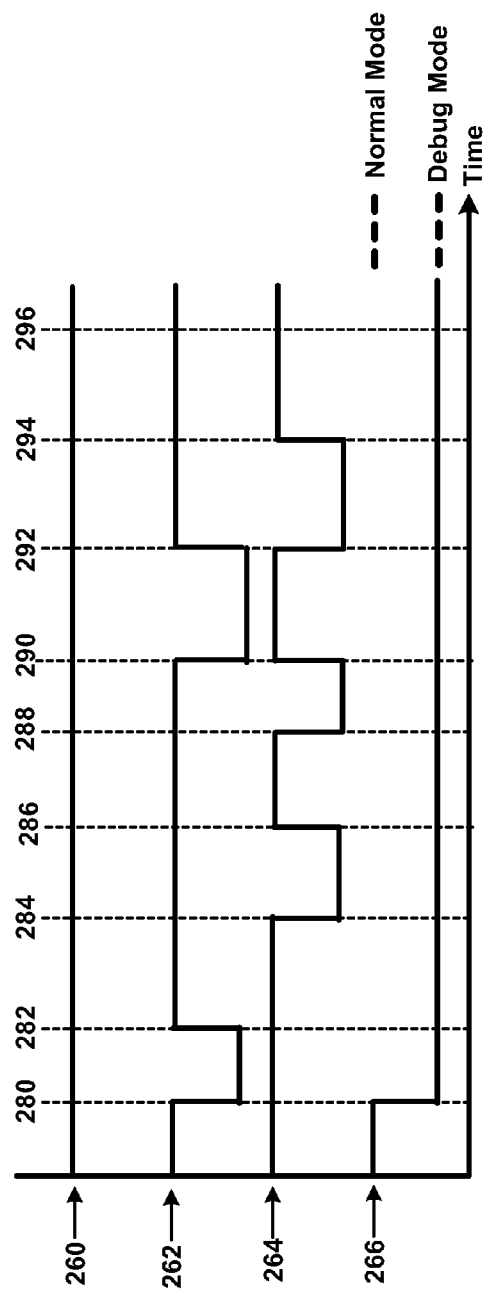
FIG. 2B is a timing diagram illustrating the manner in which service requests are processed concurrently in one embodiment.

FIG. 2B is a timing diagram illustrating the manner in which service requests are processed concurrently in one embodiment. In particular, the processing of service requests 260, 262, 264 and 266 is illustrated in FIG. 2B, with the (lower) level "Debug Mode" indicating that the service request is paused by the runtime environment due to the presence of a breakpoint in the execution path, and the level "Normal Mode" indicating that the service request is processed without pausing for debugging purpose.

Thus, service request 260 is shown as being completely processed in normal mode (without entering debug mode) due to the absence of a breakpoint in the execution path, while the processing of service request 262 is shown as entering debug mode at time points 280 and 290 due to the presence of corresponding breakpoints in the execution path. Service request 264 is shown coming out of debug mode into normal mode at time points 282 and 292 respectively.

Similarly, service request 264 is shown entering debug mode at time points 284, 288 and 292, and entering normal mode again at time points 286, 290 and 294. Service request 266 is shown as entering debug mode at time point 280 due to the presence of a breakpoint in the execution path, and continuing to be in debug mode awaiting user action thereafter.

Service request 262 is processed in debug mode, concurrent with service request 260 in normal mode in time durations 280-282 and 290-292. The concurrent processing of step 240 is thus observed in durations 280-296 (for service requests 260 and 266 in normal and debug mode respectively), 284-286 and 288-290 (service requests 260 and 262 in normal mode, and service requests 264 and 266 in debug mode), etc. The flow chart ends in step 299.

As noted above, a business flow contains a number of activities. Thus, processing a service request entails executing one or more sequences of activities, with each sequence being termed an execution path. It may be appreciated that the processing of different service requests may follow different execution paths in the business flow.

In an embodiment described below, additional visibility is based on single step debug operation, with each step corresponding to an activity of the business flow. In other words, after execution of each activity, the execution is suspended or paused until a user input is received. A user can examine various internal states (e.g. value of a variable, request/response payloads, conditional branching, current/next executing activity) between executions of successive activities. Such a feature can be useful when debugging problems such as those in business logic, request payload (content of the service request), in timing and sequencing of activities, or external services.

It may be appreciated that the granularity of such activity-size step (compared to, for example, a machine instruction level or a procedure/method level in the internal program logic) may be convenient while debugging business flows. Thus, an administrator may conveniently debug the business logic of a business flow deployed on a production server (150), while other service requests are processed according to the same business flow concurrently.

In an embodiment, the business flows are specified in BPEL and accordingly the description is continued below with respect to a production server executing such BPEL based business flows. However, alternative embodiments can be implemented for business flows specified in other high level languages, as will be apparent to one skilled in the relevant arts by reading the disclosure provided herein.

4. Production Server

Figure 3:
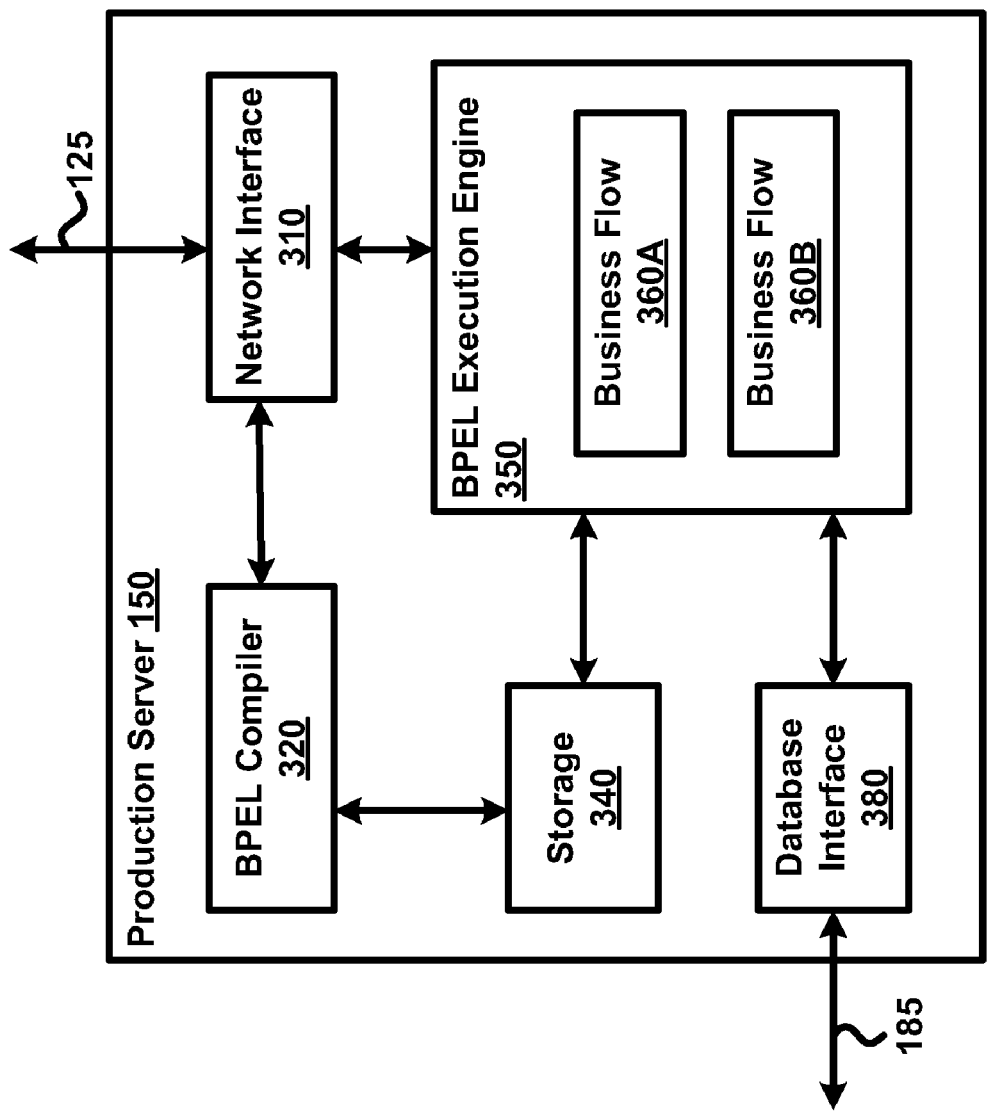
FIG. 3 is a block diagram depicting the details of production server in one embodiment.

FIG. 3 is a block diagram depicting the details of production server 150 in one embodiment. The block diagram is shown containing network interface 310, BPEL compiler 320, storage 340, BPEL execution engine 350, business flows 360A-360B and database interface 380. Each of the blocks is described in detail below.

Network interface 310 forwards service requests received (via path 125) from client systems 110A-110C (or server systems 190A-190C) to BPEL execution engine 350 and the corresponding responses from BPEL execution engine 350 to the requesting systems. Network interface 310 also receives (via path 125) source/BPEL code of business flows from developer system 170 and forwards the received code to BPEL compiler 320. Network interface 310 further facilitates business flows (such as 360A-360B) executing in the context of BPEL execution engine 350 to communicate (via path 125) with web services exposed by server systems 190A-190C.

BPEL compiler 320 receives BPEL source code (containing instructions specified in BPEL) from developer system 170 (via network interface 310) and converts the received BPEL source code into a compiled/executable form suitable for execution in BPEL execution engine 350. BPEL compiler 320 may then store the compiled/executable form in storage 340. Storage 340 represents a portion of a non-volatile memory (such as a hard disk) which is used to maintain/persist the compiled/executable form of the business flows.

In one embodiment, the high level BPEL code is first converted to a corresponding set of instructions in low level Java programming language, which is then converted to a compiled form (e.g., class files containing bytecode) using Just In Time (JIT) compilation associated with Java™ based technologies. The class files generated for a business flow is then stored together in storage 340.

It should be noted that the compiled/executable form (e.g., the class files of the above noted embodiment) does not contain specific instructions to support debugging, and yet the single step debugging feature is provided, according to several aspects of the present invention, as described in sections below. As such, even business flows that are deployed and available only in compiled form (with corresponding source code not available), can be debugged according to an aspect of the present invention.

BPEL execution engine 350 represents a flow engine capable of executing multiple business flows such as 360A-360B, and which provides the underlying logic to process each activity of a flow. An example of a BPEL execution engine is Oracle BPEL Process Manager available (as part of Oracle Fusion Middleware family of products) from Oracle Corporation, implemented as a Java application executed in the context of a Java Virtual Machine (JVM) available from Sun Microsystems.

On receiving a service request for processing according to a business flow (via network interface 310), BPEL execution engine 350 retrieves the compiled form of the flow from storage 340, initiates an instance of the business flow, and starts processing the activities specified in the instance of the business flow. As noted above, the processing of some of the activities may necessitate BPEL execution engine 350 to communicate (via network interface 310) with web services exposed by server systems 190A-190B. On completion of execution of an instance of the business flow, BPEL execution engine 350 may send a corresponding response to the service request to the requesting system (via network interface 310).

Database interface 380 facilitates BPEL execution engine 350 to store and retrieve (via path 185) information from process database 180 such as currently deployed and active business flows, the instances of each of the business flows that are currently being executed in production server 150, and the persistent state of each of the (executing instances of the) business flows. Database interface 380 also enables business flows (such as 360A-360B) to store and retrieve data from process database 180 (via path 185).

It may be appreciated that BPEL execution engine 350 may need to create and execute (in normal mode) multiple instances of the same business flow. Typically, an instance is created to process one service request, and thus multiple instances may be created (for execution in parallel) to process number of service requests. BPEL execution engine 350 may accordingly maintain information regarding the list of currently executing business flows, their instances, and the state of execution of each of the instances in process database 180 (via database interface 380).

Each of business flows 360A-360B represents a business flow that is deployed and active, executing in the context of BPEL execution engine 350. An example business flow that may be deployed in production server 150 is described below with examples. While the features of the present invention are described with respect to the example business flow of FIG. 4, it should be appreciated that the features can be similarly implemented for other business flows as well.

5. Example Business Flow

Figure 4:
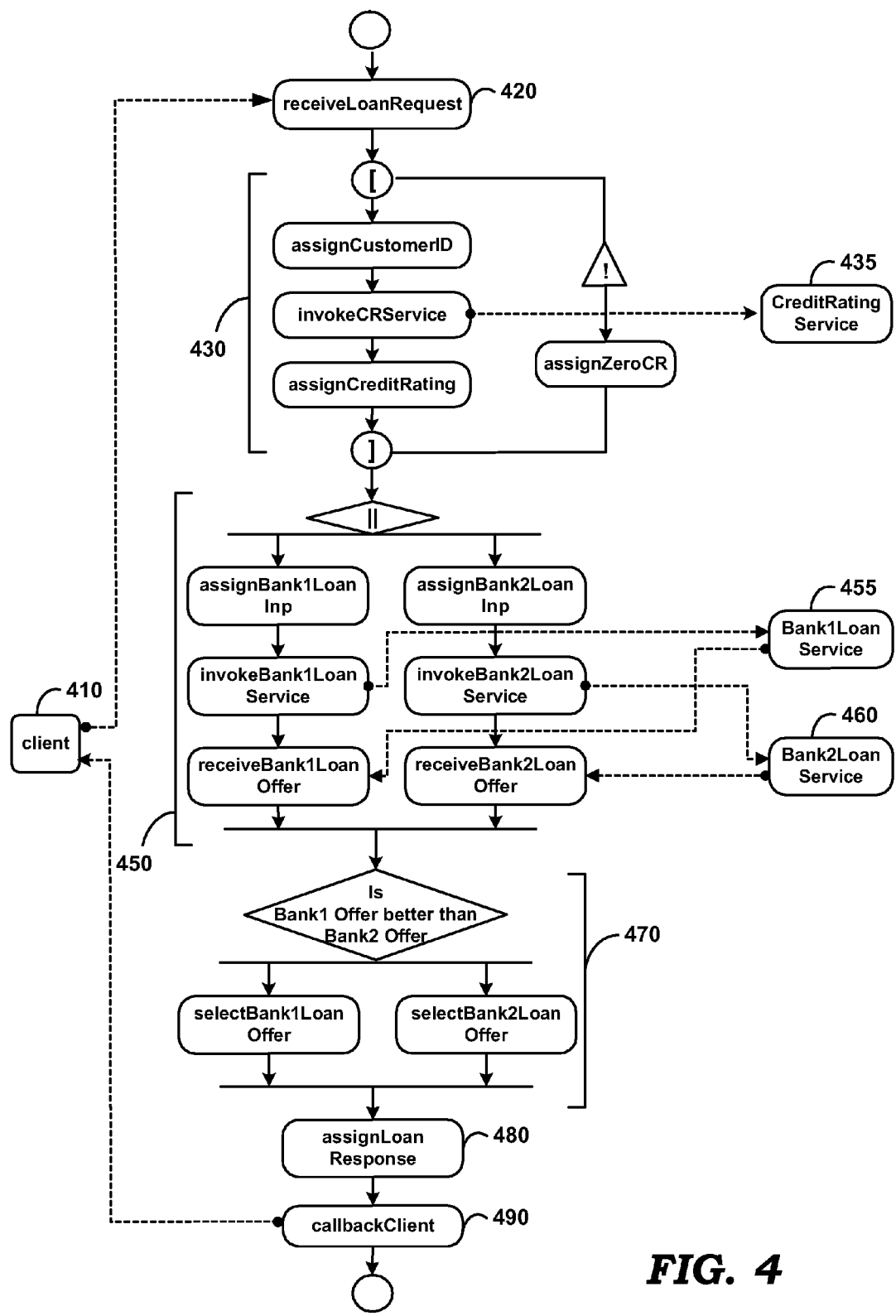
FIG. 4 is a graphical depiction of an example business flow deployed in a production server in one embodiment.

FIG. 4 is a graphical depiction of an example business flow (400) deployed in a production server (150) in one embodiment. Broadly, business flow 400 (named "HomeLoanProcessing") represents a home loan processing business flow which is executed when a home loan request is received from a customer. Business flow 400 is shown containing multiple high level activities, some of which are referred to as basic activities and others as compound activities that contain multiple basic activities, as described in detail below.

Activity 420 ("receiveLoanRequest") is a basic activity of receiving the home loan request from client 410 (which may represent one of client systems 110A-110C used by the customer, or even server systems 190A-190C).

Activity 430 ("GetCreditRating") is a compound activity (a scope activity) of checking the credit rating of the customer using the web service named CreditRatingService 435. Activity 430 is shown containing various basic activities such as assignCustomerId, invokeCRService, assignCreditRating, and also a fault handler (the basic activity assignZeroCR), which specifies that a credit rating of 0 is to be assigned if there is any fault during the processing of the compound activity 430.

Activity 450 ("GetLoanQuote") is also a compound activity (a flow activity) of retrieving home loan offers from various financial institutions (such as Bank1 and Bank2) using the corresponding web services (such as Bank1LoanService 455 and Bank2LoanService 460) exposed by the financial institution's server systems (for example, 190A-190C). Activity 450 may be performed only when the credit rating of the customer is determined to be good, after execution of activity 430.

Activity 450 is also shown having various basic activities such as assignBank1LoanInp, InvokeBank1LoanService, and receiveBank1LoanOffer, which together operates to invoke the web service Bank1LoanService 455 and receive the home loan offer from Bank1. Similarly, other corresponding sets of basic activities may operate to receive loan offers from other banks by invoking the appropriate web services. It may be noted that the two sets of basic activities (each for a corresponding bank) are shown as two different branches, though the sets are performed in parallel.

Activity 470 ("SelectLoanQuote") is a compound activity (a switch activity) that compares the loan offers received from the two banks and selects the better of the two offers. The comparison may be performed in any desired manner, for example, based on the interest rates charged on the home loans (with the offer having the lower interest rate being selected).

Activity 480 ("assignLoanResponse") is a basic activity that assigns the selected offer to the response variable for the request (received in activity 420) and activity 490 ("callbackClient") is the basic activity that sends the response (containing the best home loan offer) to client 410.

Thus, business flow 400 enables a customer to find a suitable home loan offer among the different offers provided by various financial institutions. It may be observed that each activity is specified at a high level, with the actual execution logic (for example, the manner of assignment, invocation, receiving requests/offers, accessing different web services) contained in the compiled BPEL Process executed by BPEL execution engine 350. Alternative technologies which execute the activities without compilation can also be used.

The BPEL source code (in XML format) corresponding to business flow 400 is shown in Appendix A. There, the XML tags such as "<receive>", "<assign>" and "<invoke>" specify basic activities while the XML tags such as "<sequence>", "<scope>", "<flow>", and "<switch>" specify compound activities. Some of the activities specified according to BPEL and used in Appendix A, are further described in detail in a document entitled, "OASIS BPEL2.0 Primer" widely available from OASIS, Post Office Box 455, Billerica, Mass. 01821, USA, +1 978 667 5115.

In one embodiment, the BPEL instructions (in XML format) shown in Appendix A is received by BPEL compiler 320 (from developer system 170) and then converted to low level instructions in Java programming language. The Java instructions are then converted to a compiled form (e.g., class files containing bytecode) and then executed in the context of BPEL execution engine 350.

Thus, multiple business flows are executed in the context of a flow engine such as BPEL execution engine 350. According to an aspect of the present invention, BPEL execution engine 350 facilitates single step debugging of business flows (such as 360A-360B). BPEL execution engine 350 may maintain information related to debugging such as the list of the instances of the business flows currently being debugged, and the debugging state of each of the instances of the business flows in process database 180 (via database interface 380).

The manner in which BPEL execution engine 350 facilitates debugging of business flow 400 (HomeLoanProcessing flow) of FIG. 4 in a production server, is described below with examples.

6. Sample User Interfaces

FIGS. 5A-5H together illustrates the manner in which debugging (in particular single step debugging) of a business flow (400) deployed in a process server (150) is facilitated in one embodiment. Each of the Figures is described in detail below.

Figure 5B:
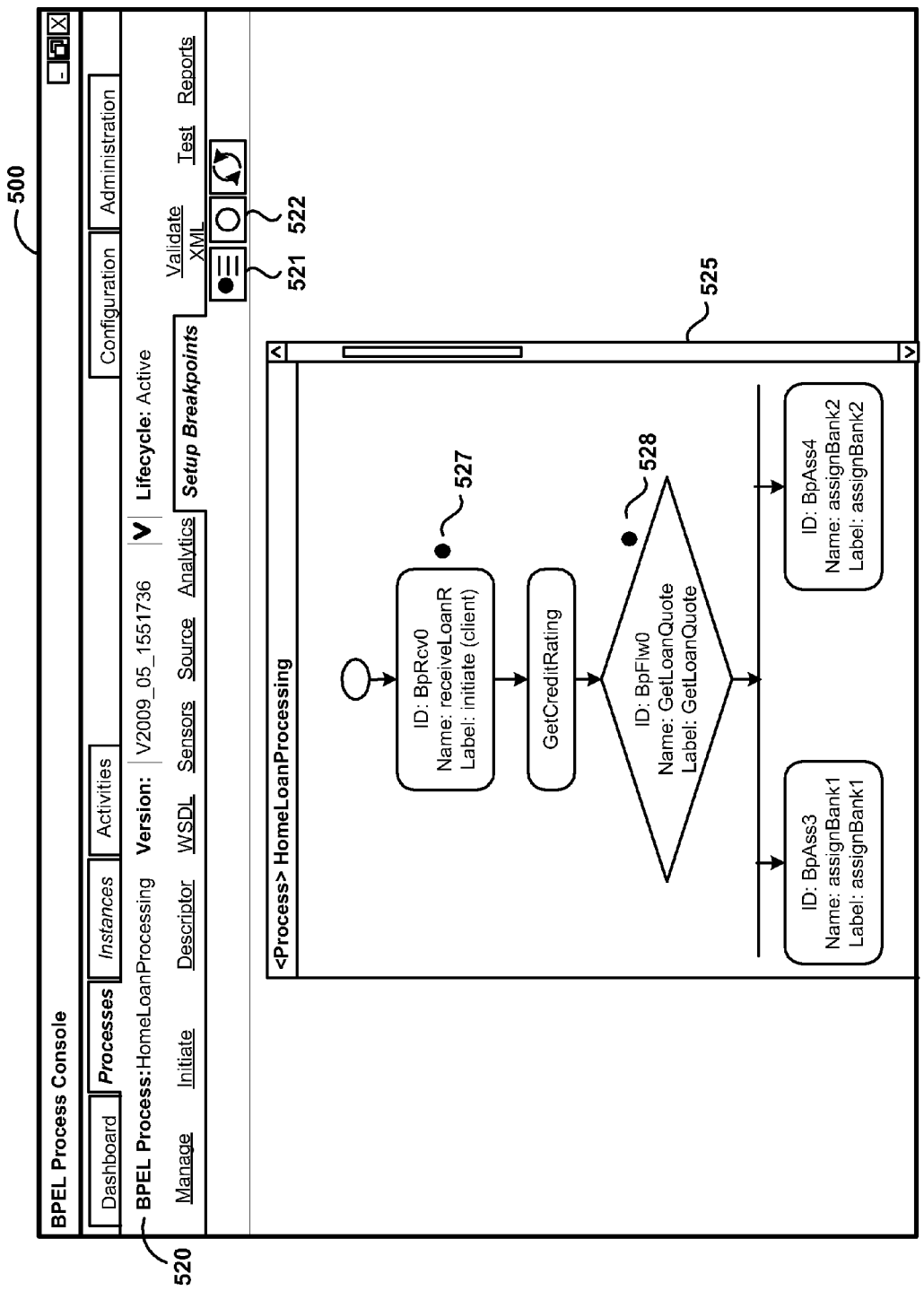

FIG. 5A depicts the manner in which a User selects a desired business flow deployed in production server 150 for debugging in one embodiment. Display area 500 (also in FIGS. 5B-5H) depicts a portion of a user interface that may be displayed on a display unit associated with a system from which a User desires to debug the business flow. In one embodiment, the user interface is provided as a web page that can be viewed using a web browser, and accordingly the User can use any system (such as client systems 110A-110C, server systems 190A-190C, developer system 170) that has a web browser to debug business flows. Text 510 "BPEL Process Console" indicates that user interface may be used by the User to control the operations of business flow engine 350 (and in turn production server 150).

Display area 515 depicts a list of business flows deployed in production server 150. The name of each BPEL process is shown associated with the lifecycle status (whether it is currently active), the number of open instances actively processing service requests and the number of closed instances that have finished processing previously received requests. A user may select any one of the desired business flow for debugging by clicking on the corresponding row from the list. The user is shown to have selected the latest version of the "HomeLoanProcessing" business flow (row 518) to be debugged.

FIG. 5B depicts the manner in which a User is enabled to specify manual breakpoints (at a process level) for a business flow selected for debugging in one embodiment. Display area 500 of FIG. 5B may be displayed in response to the User selecting the desired business flow in display area 515. Display area 520 displays details such as the name, the version, the lifecycle status of the business flow selected by a user for debugging.

Display area 525 displays a graphical representation of the business flow selected for debugging. It may be observed that the graphical representation shown in display area 525 is similar to the graphical depiction of the business flow "HomeLoanProcessing" shown in FIG. 4. However, it may be observed that in addition to the name of the activity specified in FIG. 4, a unique activity identifier (ID) and a label is shown associated with each activity. The activity identifiers and the labels may be generated when the BPEL instructions are converted to low level instructions and may be used for uniquely identifying each of the activities specified in the business flow.

Buttons 521 (SetBreakpoint) and 522 (ClearBreakpoint) respectively enables a User to manually add or remove process level breakpoints for the business flow shown in display area 525. On reaching a breakpoint, BPEL execution engine 350 suspends execution of the flow instance and continues execution only on receiving a user input. Process level breakpoints are specified on a business flow and accordingly are applied for each instance of the business flow created by BPEL execution engine 350 to process service requests.

Display area 525 indicates (by the filled circle shown adjacent to the activity) that the user/administrator has specified two process level breakpoints at 527 and 528 respectively for the activities receiveLoanRequest and getLoanQuote. When a service request is received for a business flow, an instance is created and process breakpoints (if any) are copied to the instance breakpoints (breakpoint table associated with the specific instance) and execution is initiated. At runtime, when a business flow instance execution reaches an activity that has an instance breakpoint, it causes the execution to pause and enters debug mode. If an instance runs without encountering any instance breakpoint during its course of execution, the business flow instance is said to execute in normal mode.

Thus, a User is enabled to cause some of the service requests to be processed in a debug mode concurrently with the processing of other service requests in a normal mode.

Figure 5C:
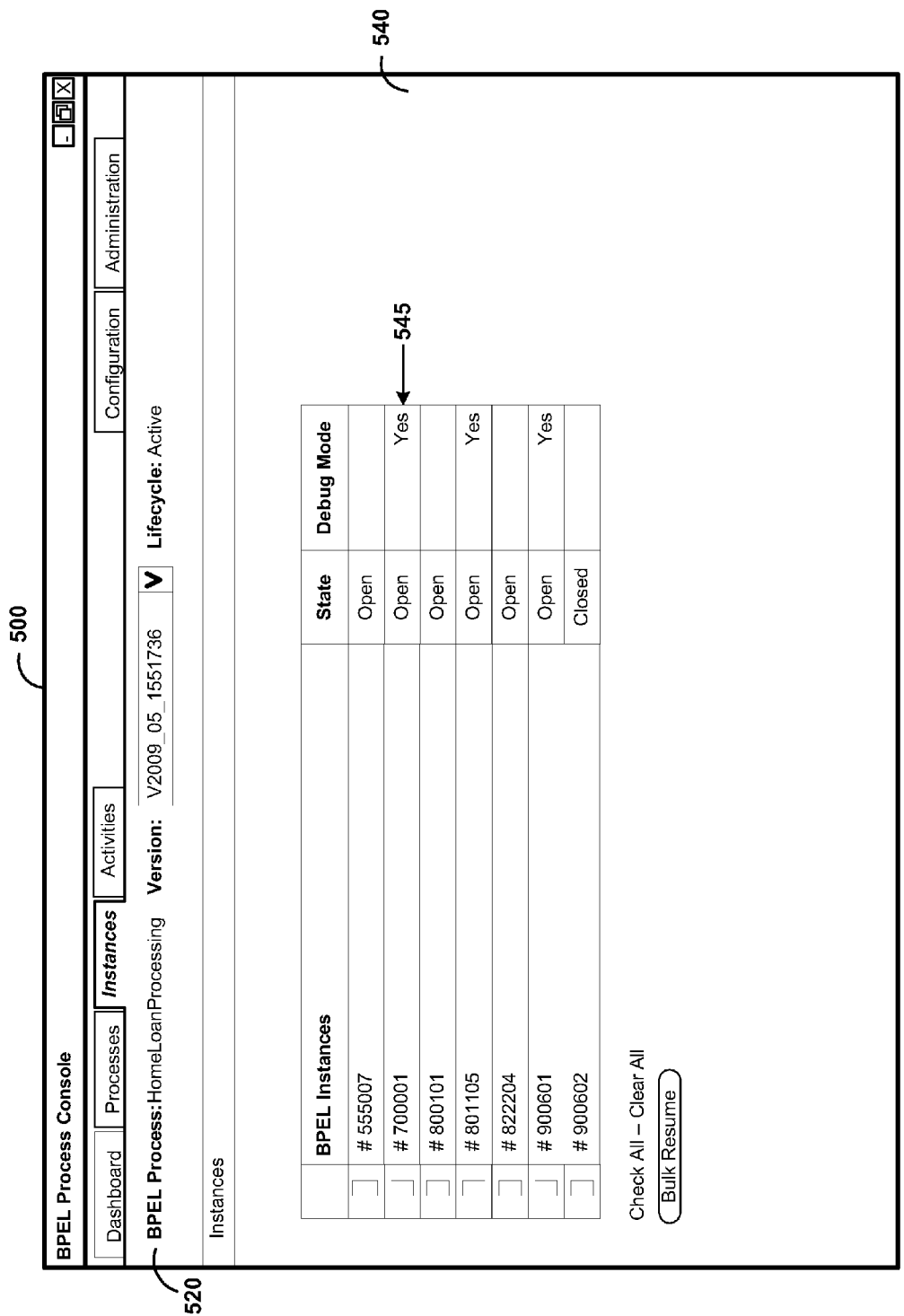

FIG. 5C depicts the manner in which information about instances of a business flow executing in a production server (150) is provided to a User in one embodiment. Display area 540 depicts a list of instances of the business flow HomeLoanProcessing (as indicated in display are 520) deployed in production server 150. The name of each instance is shown associated with the state (having values "Open" or "Closed") and whether the instance is executing in a debug mode (value "Yes"), i.e., indicating that the instance is awaiting user action to continue execution.

A user may select any one of the instances executing in debug mode to start debugging the business flow (for example, view the internal execution state) by clicking on the corresponding row from the list. Thus, the user is shown to have selected the instance "#700001" of the "HomeLoanProcessing" business flow (row 545) for debugging. The manner of operation of an instance in debug mode is described below with examples.

7. Processing in Debug Mode

FIGS. 5D-5H together depict the manner in which an instance of a business flow processes service requests in debug mode in one embodiment. Display area 500 of FIG. 5D may be displayed in response to a user selecting the instance "#700001" (row 545) in the user interface of FIG. 5C. Similar numbers are used to represent corresponding portions of FIGS. 5D-5H, and hence descriptions of such portions are not repeated for conciseness.

Figure 5D:
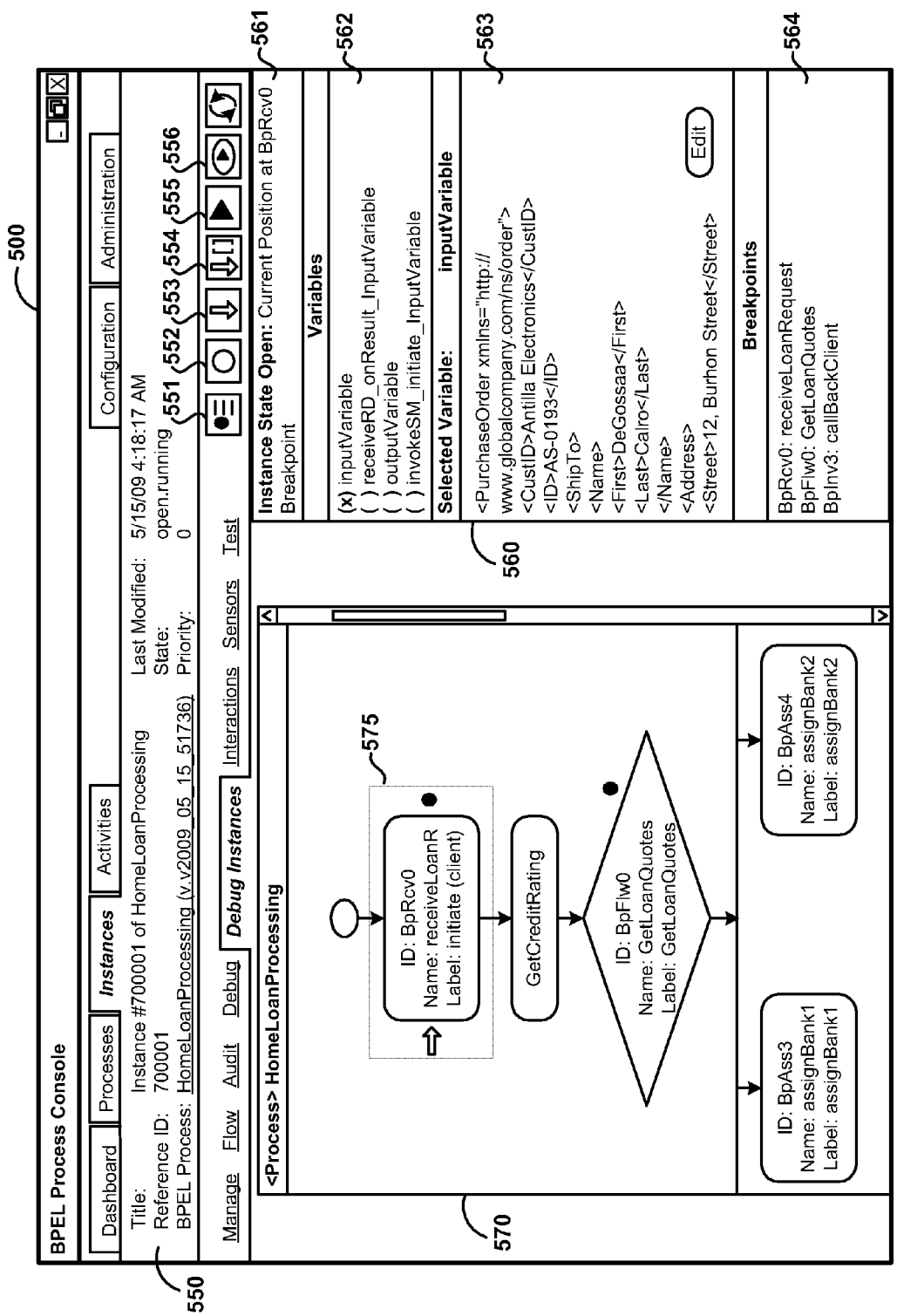

Referring to FIG. 5D, display area 550 specifies the details of the instance of the business flow selected to be debugged (and hereafter referred to as "debug instance"). In particular, display area 550 indicates the name "HomeLoanProcessing" of the business flow, a unique identifier "700001" of the debug instance, and the current state of the debug instance. It may be observed that the state of the debug instance (of the "HomeLoanProcessing" flow) is shown as "open.running" indicating that the instance is (in the midst of) processing the service request. Display area 570 (similar to display area 525) displays a graphical representation of the debug instance (business flow "HomeLoanProcessing") selected for debugging.

Display area 560 displays information useful for debugging the business flow. For example, display area 561 indicates that current position (activity/step) in the business flow at which execution is paused. Display area 562 displays a list of variables specified in the BPEL instructions (as specified by the "<variables>" tag in Appendix A) to facilitate the user to select and inspect the values of the variables.

Display area 563 displays the value of the variable ("input-Variable") selected by the user from the list shown in display area 562. The button labeled "Edit" enables the User to modify the value of the selected variable and to continue execution of the debug instance using the modified value. Display area 564 displays a list of instance breakpoints (either derived from the process breakpoints or explicitly specified on the instance by the user) specified for the instance of business flow.

It may be observed that display area 564 indicates that there are two breakpoints "BpRcv0" and "BpFlw0" (derived from the process level breakpoints specified by the user using the interface of FIG. 5B), with display area 561 indicating that the current (execution) position is breakpoint "BpRcv0" which corresponds to the "receiveLoanRequest" activity. It may be further observed that display area 564 indicates an instance breakpoint "BpInv3" for the activity callBackClient (490 of FIG. 4) that may be specified by a user, using button 551 as described in detail below.

Buttons 551 (SetBreakpoint) and 552 (ClearBreakpoint) respectively enables a user/administrator to manually add or remove instance breakpoints for the debug instance shown in display area 570. Instance breakpoints are specified on an instance of the business flow, in contrast to process breakpoints which are specified on the business flow (and thereby applicable to all the instances of the business flow). Thus, a user may select the activity "callBackClient" in display area 570 and click on SetBreakpoint button 551 to add an instance breakpoint for the activity (as indicated by display area 564).

SingleStep button 553 enables a user to perform a single step operation on the indicated current activity (at which the execution is paused as shown in display area 561) and to pause execution before the next activity in the execution path of the business flow. StepBlock button 554 enables the user to perform a step-block operation on a compound activity, indicating a step over the entire compound activity. Thus, for a compound activity (containing multiple basic activities), when SingleStep button 553 is clicked, the execution is paused before each basic activity in the compound activity, while when StepBlock button 554 is clicked, all basic activities contained in the compound activity are performed, before execution is paused.

Resume Button 555 enables the user to send a resume operation causing the execution of the activities in the business flow to be performed until the next breakpoint is reached. ClearAll&Run button 556 enables the user to indicate that all breakpoints are to be cleared and execution to continue till the end of business flow. A user may click ClearAll&Run button 556 after determining the problem in the business flow. Each single step operation, step block operation or the resume operation (with or without clearing all breakpoints) may be viewed as a continue operation indicating that the execution of the business flow is to be continued from the current execution position.

It may be observed that in display area 570, activity 575 (receiving a loan request) in the business flow "HomeLoanProcessing" is shown highlighted (by a dotted rectangle) and associated with a horizontal arrow to indicate the current execution position. Furthermore, activity 575 has a filled circle on the right side, indicating the location of a breakpoint. Thus, FIG. 5F indicates that the instance is in debug mode, waiting on a breakpoint at activity BpRcv0, and awaiting user input for proceeding.

Figure 5E:
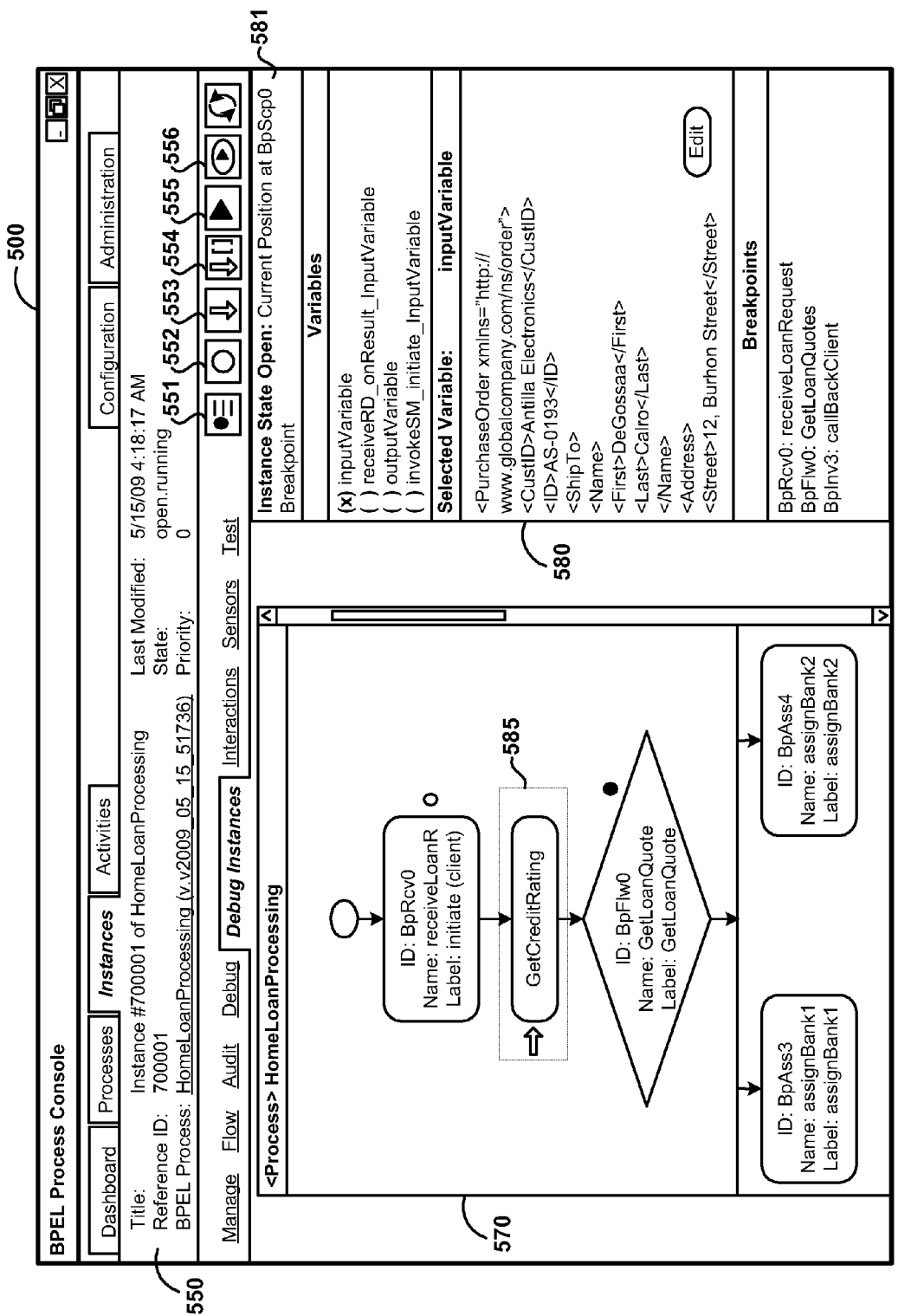

On receiving a user input (such as clicking of SingleStep button 553), activity 575 is performed and the interface of FIG. 5E is displayed. Alternatively, a user may click Resume button 555 to send a resume operation and cause the interface of FIG. 5F to be displayed (corresponding to the next breakpoint as shown by the filled circle) without displaying the interface of FIG. 5E.

Referring to FIG. 5E, display area 500 there depicts a user interface displayed after single step operation on activity (575) in the business flow "HomeLoanProcessing" is complete. It may be observed that the next activity 585 (GetCreditRating) has been highlighted and the arrow is shown associated with the next activity 585. Display area 580 is shown updated to respectively indicate the new current position (581), updated value of variable selected, and current breakpoints for the instance of business flow "HomeLoanProcessing" (similar to that shown in display area 564).

It may be appreciated that the GetCreditRating activity has an associated FaultHandler. Accordingly, when single step operations (by clicking SingleStep button 553) are performed on the activity, the user interface will indicate the assignCreditRating activity on successful execution or the activity assignZeroCR activity in case of a fault invoking the CreditRatingService. A user may also click StepBlock button 554 to perform the compound activity 585 as a single operation.

Thus, FIG. 5E indicates that activity (575) has been completed, and a user input is expected to proceed with the debugging of the next activity (585). On receiving a user input (assuming clicking of StepBlock button 554), the next activity 585 (of getting the credit rating of the customer) is performed and the interface of FIG. 5F is displayed.

Figure 5F:
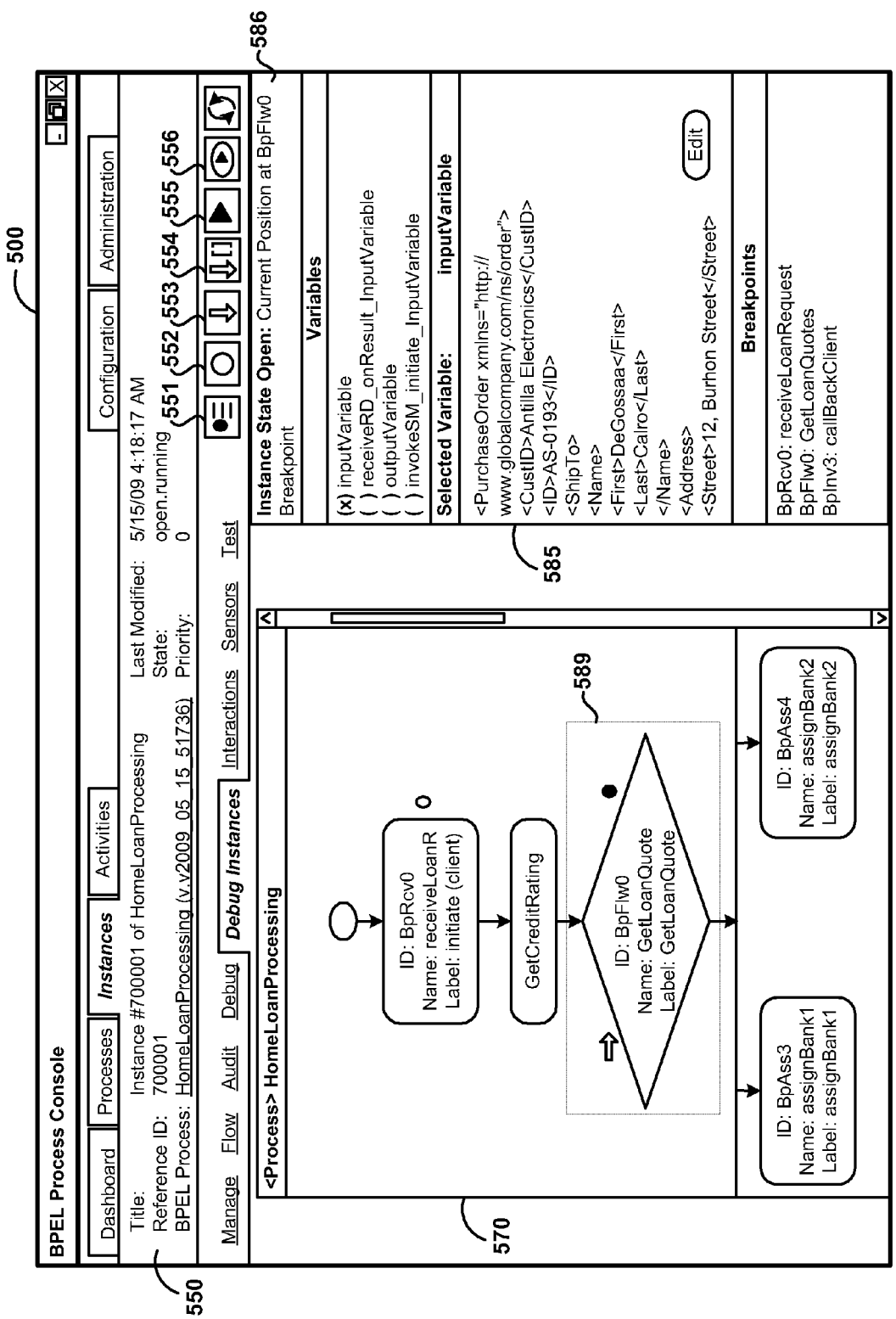

Referring to FIG. 5F, display area 500 there depicts a user interface displayed after execution of compound activity (585) in the business flow "HomeLoanProcessing" is completed. It may be observed that the next activity 589 (GetLoanQuotes) has been highlighted and the arrow is shown associated with the next activity 589. Display area 585 (or 586-587) is shown updated to respectively indicate the new current position (586), updated value of variable selected and current breakpoints for the instance of business flow "HomeLoanProcessing".

It may be appreciated that the flow activity (GetLoanQuotes) is for getting offers from multiple loan providers using corresponding web services, and contains sets of basic activities that are performed in parallel. A user may click SingleStep button 553 to do a step operation causing execution to be paused before the first basic activity in each of the two branches within the compound activity 589, and accordingly the interface of FIG. 5G may be displayed.

Figure 5G:
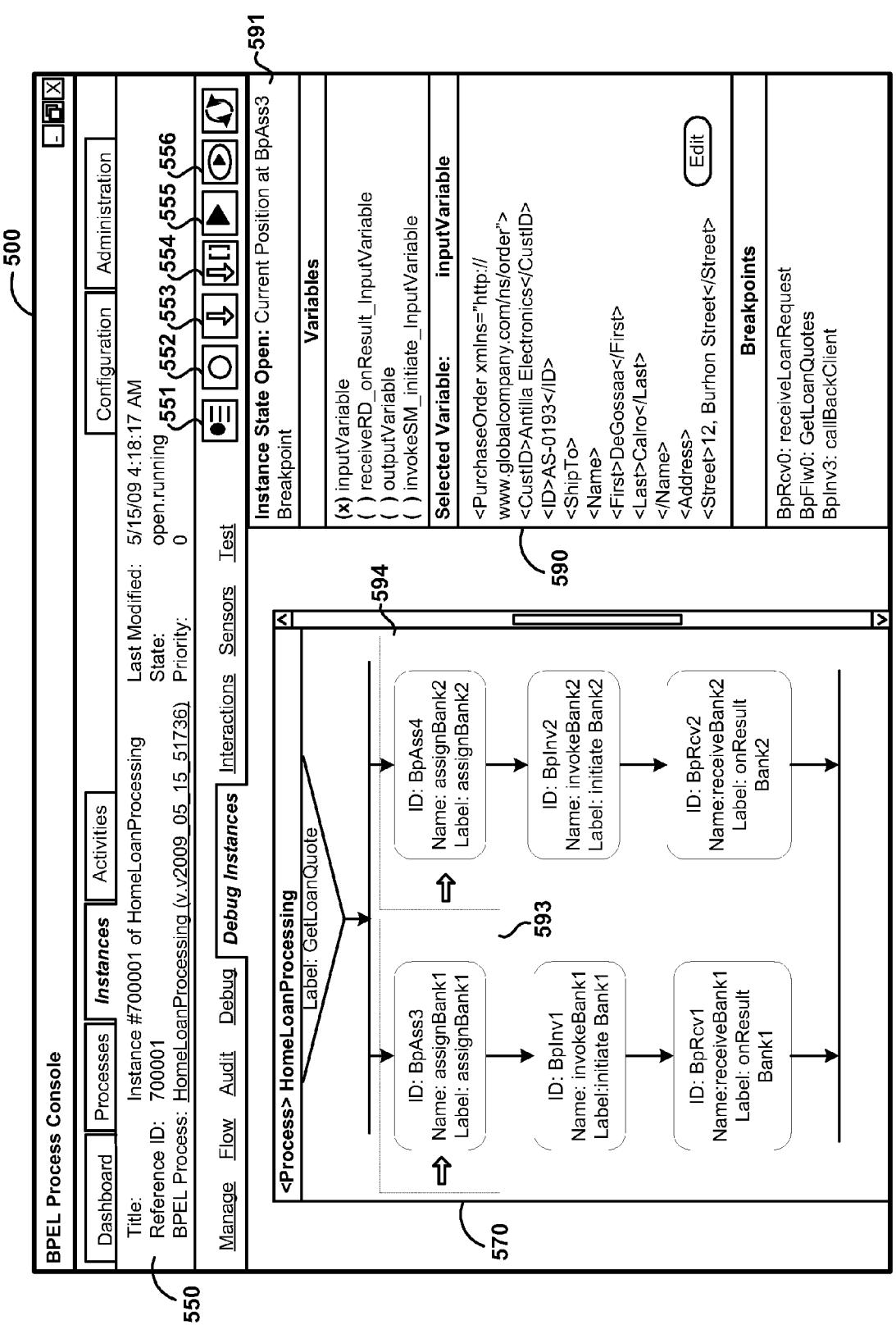

Referring to FIG. 5G, the first basic activity on both branches (593 and 594) that assigns input variable for the corresponding loan providers (Bank1 and Bank2 in this example) is shown highlighted as the current positions. Display area 590 is shown updated to respectively indicate the new current position (591), updated value of variable and current breakpoints for the business flow "HomeLoanProcessing" after successful execution of activity 589.

The User may select one of the branches to debug in single step operation (for example, using a mouse in display area 570) and then specify the single step operation (by clicking SingleStep button 553) for the selected current activity. Accordingly the interface of FIG. 5H may be displayed (assuming that the Bank1 branch is selected by the user).

Figure 5H:
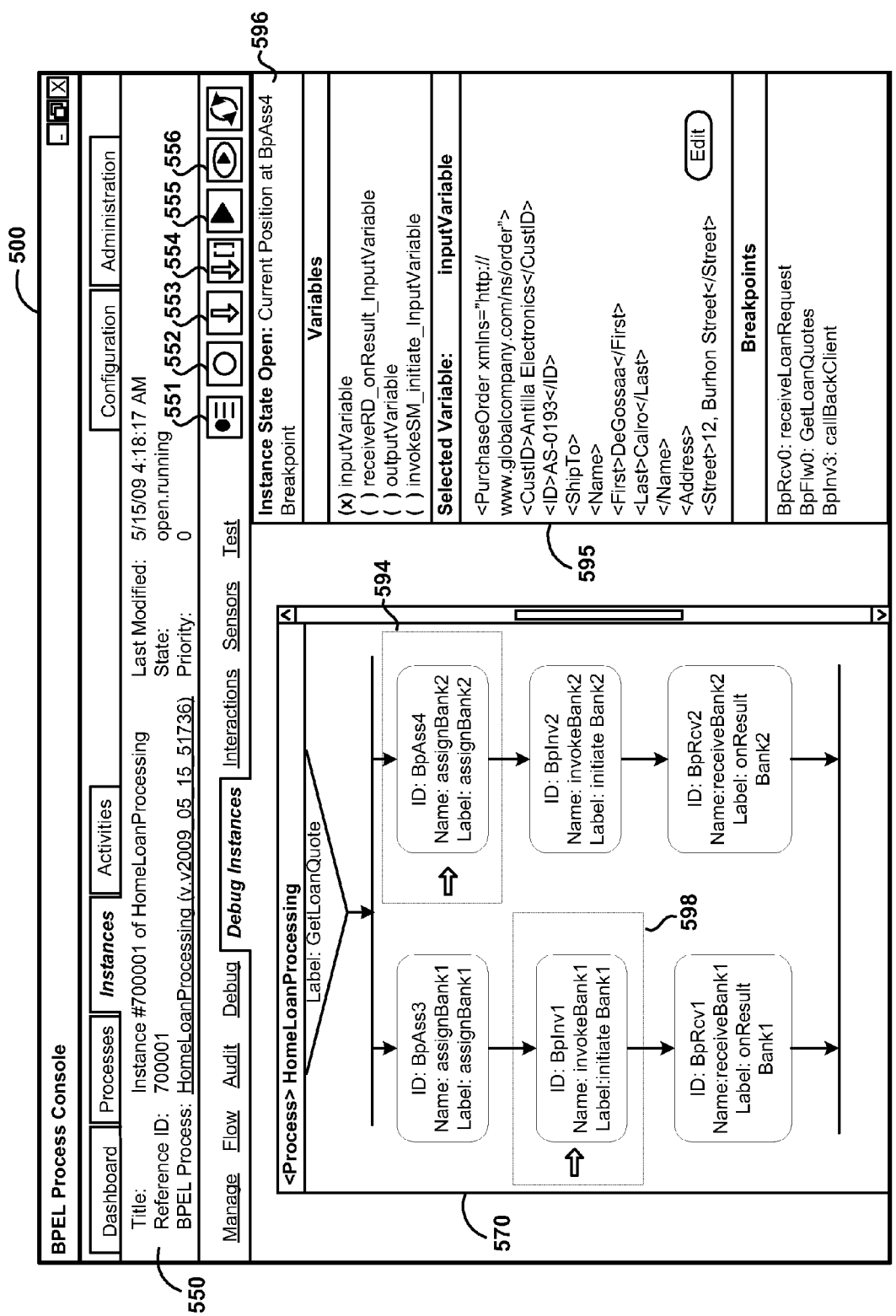

Referring to FIG. 5H, display area 500 there depicts a user interface displayed when a single-step operation has been performed on one of the branches of the flow activity. It may be observed that the execution is shown as having proceeded to the next activity 598 ("invokeBank1LoanSerice") for the Bank1 loan provider, while for the other loan provider Bank2 the current position is highlighted as the same activity 594 as was shown in FIG. 5G. Display area 595 is shown updated to reflect the current execution location (596), updated value of variable and the current breakpoints for the business flow "HomeLoanProcessing".

On successful completion of the compound activity, a User may continue to perform debugging of the "HomeLoanProcessing" flow until the final activity (of sending a response to the loan request indicating the offer with the lowest interest rates) is performed. Alternatively, the user may clear all breakpoints and continue execution of the flow at any activity (by clicking ClearAll&Run button 556), if the user has determined the problem associated with the processing logic of the business flow.

Thus, a User is enabled to perform debugging (and in particular single step debugging) of the business flow "HomeLoanProcessing" executing in production server 150. It may be appreciated that by enabling the user to create an instance of the business flow in a debug mode, other service requests received during debugging may be processed concurrently using other instances of the same business flow in normal mode. Thus, a business flow is enabled to be debugged without affecting the performance of other business flows on the production server.

It should be appreciated that there are several possibilities to the execution path (the sequence of activities executed) when processing a service request, since the flow can progress in more than one direction from a given activity. For example, from the basic activity InvokeCRService, the flow could be to assignCreditRating or assignZeroCR activity, depending on whether the InvokeCRService operation executed successfully or caused a Fault. Similarly, a compound flow activity (e.g., 450) can have multiple parallel branches (e.g., one for invoking Bank1Loan service and the other for invoking Bank2Loan service) and accordingly there could be more than one next activity to be performed.

According to one embodiment, a token based routing mechanism is used in flow engine to control the execution flow of the business process. An aspect of the present invention takes advantage of such a mechanism to provide some of the features described above by extending the flow engine (BPEL execution engine 350) as described below with examples.

8. Flow Engine

Figure 6:
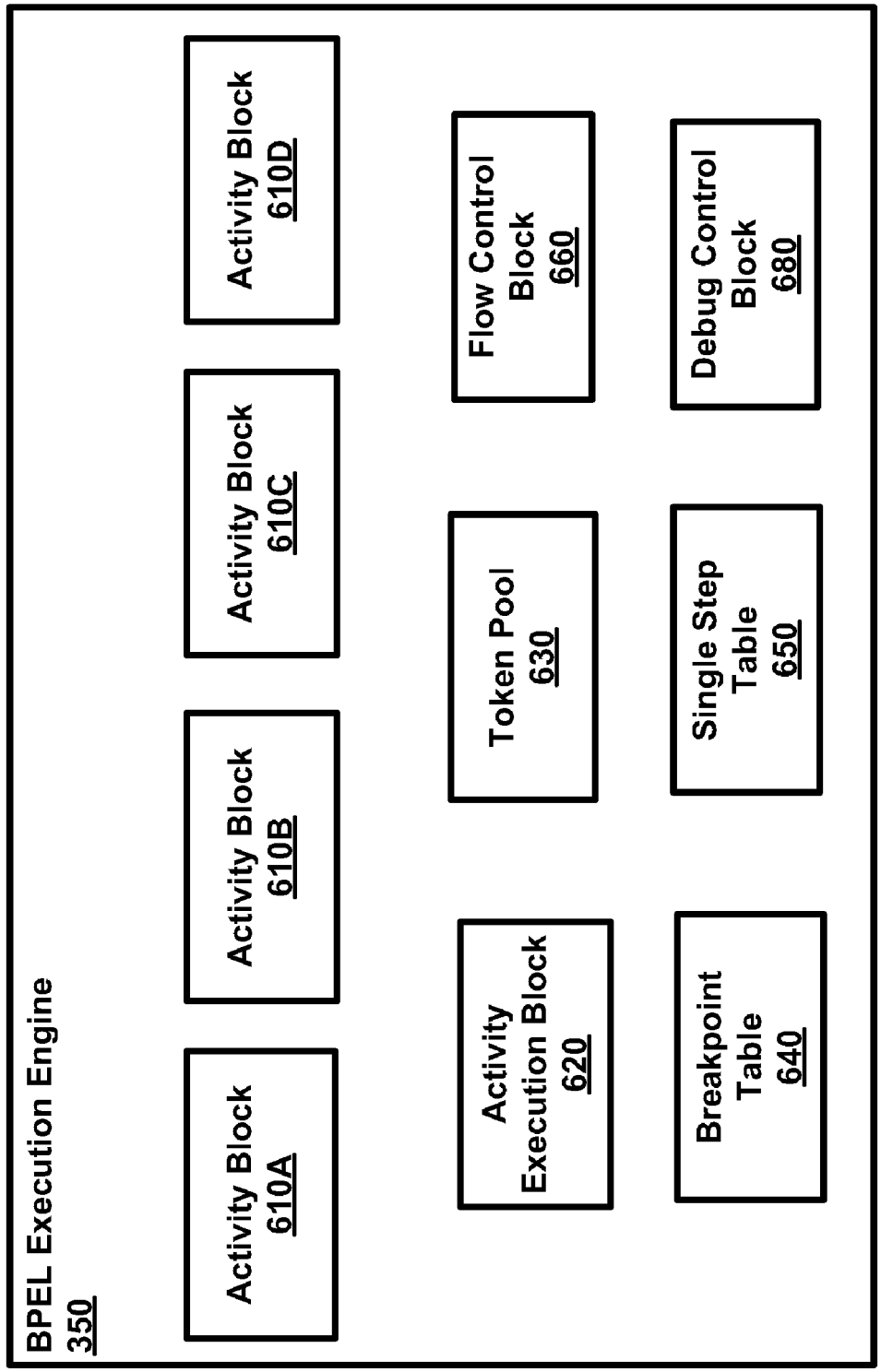
FIG. 6 is a block diagram depicting the internal details of a flow engine (BPEL execution engine) in one embodiment.

FIG. 6 is a block diagram depicting the internal details of a flow engine (BPEL execution engine 350) in one embodiment. The flow engine is shown containing activity blocks 610A-610D, activity execution block 620, token pool 630, breakpoint table 640, single-step table 650, flow control block 660 and debug control block 680 for a single instance of business flow. Flow control block 660, activity execution block 620, and debug control block 680 are common for all the business flows executing in the BPEL Engine and thus forms part of the run-time environment. Activity blocks 610A-610D are specific to a business flow and shared by all instances of the business flow. Token pool 630, breakpoint table 640 and single-step table 650 may be replicated for corresponding number of instances of the business flow. Each of the blocks is described in detail below.

Each of activity blocks 610A-610D represents the execution code for a corresponding basic or compound activity specified in the business flow language (such as BPEL). For example, activity block 610A may correspond to a receive activity (such as receiveLoanRequest 420) and may contain internal program logic designed to receive a service request from client 410 and to initialize input variables with the received request data to facilitate execution of the business flow. Activity block 610B may correspond to a scope activity (such as GetCreditRating 430) and may contain program logic to initialize variables required for the scope activity and to forward control to the different basic activities (such as assignCustomerID, and invokeCRService) specified within the scope activity. Similarly, activity blocks corresponding to other activities specified in the business flow may be created and loaded (from storage 340) for execution by BPEL execution engine 350.

In an embodiment, each activity block is in a compiled format containing Java byte-code/machine level instructions ready for execution, in contrast to BPEL source code, which typically contains activities that are specified by a process modeler/developer. For example, when the BPEL activities specifying a business flow is first converted to a corresponding set of instructions in low level Java programming language, each of activity blocks corresponds to a compiled Java class (named as BpRcv0, BpScp0, BpAss0 based on the activity identifier, noted above) generated for a corresponding activity specified in business flow 400.

Each activity block is designed to execute only when a token for the corresponding activity is available from activity execution block 620. Each activity block on completion, is also designed to generate tokens for the next activity (or set of activities) to be executed by BPEL execution engine 350. The tokens generated are stored in token pool 630 and are consumed/removed when a corresponding activity block is executed.

For example, activity block 610 (receive activity) is designed to execute when a token "BpRcv0" (identifier of the activity) is available from activity execution block 620, and on successful completion to generate a token "BpScp0" (added to token pool 630) identifying the subsequent Scope activity (activity block 610B) to be executed. The initial token "BpRcv0" for the first activity is generated by the flow control block 660 on instantiation of the business flow.

Flow control block 660 controls the sequence of execution of the specific activities (the execution path) in coordination with activity execution block 620 and keeps track of the status of execution of activity blocks (e.g. 610A-610C) currently executing in BPEL execution engine 350. The control on the order of execution of different activities is done using tokens (as noted above), with availability of each token indicating that a corresponding activity in the business flow is ready to be executed next.

Flow control block 660 invokes activity execution block 620 to check whether an activity is ready to execute depending on the availability of a corresponding token and then performs/executes the activity, if the corresponding token is available. Thus, in the above example, flow control block 660 invokes the activity execution block 620 to determine that a token for "BpScp0" is available, and accordingly performs the BpScp0 activity.

Activity execution block 620 provides a context for execution of activity blocks in BPEL execution engine 350. Activity execution block 620 has access to token pool 630 and on instruction from flow control block 660 can check availability of token in token pool 630 and execute the corresponding activity block. Thus, activity execution block 620 on enquiry from flow control block 660 responds that the "BpScp0" token is available in token pool 630, and subsequently on instruction from flow control block 660, initiates execution of the activity block 610B, which causes the scope activity to be performed.

According to an aspect of the present invention, activity execution block (620) is extended to operate in conjunction with Breakpoint table 640 and SingleStep table 650 to facilitate debugging, as described below with examples.

9. Debugging

Breakpoint table 640, provided according to an aspect of the present invention, maintains information related to the breakpoints specified for the business flow instance. In particular, when an instance is executed in debug mode, table 640 stores the identifiers of activities at which there is a breakpoint. Thus, when an instance is executed in normal mode, table 640 will be empty (i.e. no breakpoints).

Each of FIGS. 7A-7E depicts the content of breakpoint table 640 at different time instances in one embodiment. The table is shown containing column 711 "ActivityId" indicating the activity identifier at which the corresponding breakpoint is specified, column 712 "Activity Name" indicating the name of the activity (as specified in FIG. 4), column 713 "Type" indicating whether the breakpoint is a user-specified breakpoint or an internal breakpoint (created by BPEL execution engine 350) and column 714 "State" indicating the state of the corresponding breakpoint. It is noted that the BPEL execution engine 350 operates only based on the activity identifier, and the activity name is optional and included in breakpoint table 640 for clarity.

FIG. 7A depicts the content of breakpoint table 640 when an instance is created in one embodiment. As noted above, when an instance is created, any process breakpoints specified by the User are copied to the breakpoint table of the instance. Thus, entries 721 and 722 represent instance breakpoints created by copying the corresponding process breakpoints 527 and 528 (specified in FIG. 5B) from a process breakpoint table (not shown in FIG. 6) to breakpoint table 640. While the breakpoints copied from the process breakpoint table cause entry into debug mode as described above, it should be appreciated that such breakpoint entries can be introduced into the breakpoint table after creation of the instance, for example, when a business flow is waiting on a mid-process Receive or a Wait activity (causing the instance to be saved/dehydrated in process database 180).

Figure 8:
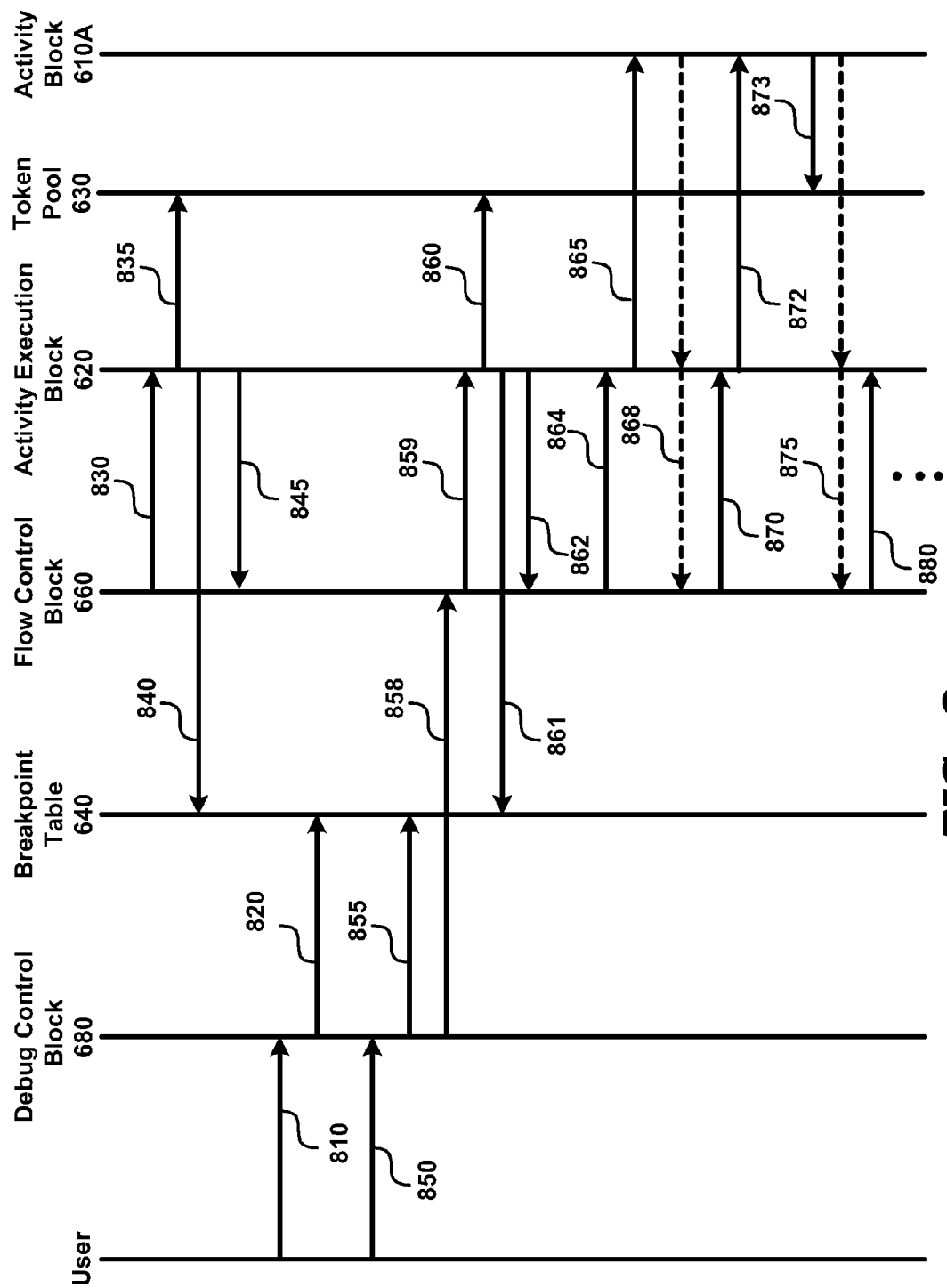
FIG. 8 is a sequence diagram illustrating the manner in which debugging is facilitated in a flow engine in one embodiment.

FIG. 8 is a sequence diagram illustrating the manner in which debugging is facilitated in an embodiment. Debug control block 680 receives from a user (step 810), the specific activities at which instance breakpoint is to be set/cleared, and then adds/deletes (step 820) the corresponding entries in breakpoint table 640. FIG. 7B depicts the content of breakpoint table 640 after the addition of an instance breakpoint by a User in one embodiment. Entry 723 represents an instance breakpoint set by a User for the activity "callBackClient" using the SetBreakpoint button 551 in the user interface of FIG. 5D.

When an instance of business flow "HomeLoanProcessing" is created to process a service request, initial token for the first activity (BpRcv0) is generated and flow control block 660 is invoked to start the execution of the instance. Flow control block 660 then invokes activity execution block 620 in step 830, to check if a corresponding token is available for the BpRcv0 activity.

In step 835, activity execution block 620 checks if the token for BpRcv0 activity is available in token pool 630. If the token is not available, it returns false. If token is available in token pool 630, then it looks up breakpoint table 640 to check if there is a breakpoint on activity BpRcv0 (step 840). As a match is detected (row 721), activity execution block 620 returns false to flow control block 660 (step 845), indicating that activity BpRcv0 is not ready to execute (due to presence of a breakpoint). Instance execution is paused on the initial activity breakpoint. The interface of FIG. 5D is displayed to the user. Debug control block 680 waits for user input. It may be noted that execution would have continued (as in step 865), if a token was available in token pool 630, and a matching entry was not found in the breakpoint table.

User performs a resume operation using Resume button 555. On receiving the resume operation (step 850), debug control block 680 disables the breakpoint (by changing state to closed, as shown in row 731 of FIG. 7C) in step 855 and continues execution of the business flow by sending a resume operation (step 858). Flow control block 660 then invokes activity execution block 620 (in step 859) to check whether token is available for the BpRcv0 (withheld earlier). Activity execution block 620 checks for the token in token pool 630 (step 860), then looks up the breakpoint table 640 (step 861) and finds the breakpoint on BpRcv0 in closed state (entry 731), and therefore returns true indicating that the token is available (step 862).

Next, flow control block 660 invokes activity execution block 620 (in step 864) to perform the BpRcv0 activity, due to the readiness of the activity to perform, as indicated by the "true" value returned in step 862. Activity execution block 620 in turn invokes the activity block (610A) corresponding to the BpRcv0 activity. Activity block 610A executes the program logic corresponding to the activity (in step 865), and on completion transfers control to flow control block 660 (step 868).

Flow control block 660, on identifying that execution of activity block 610A is complete, invokes activity execution block 620 (in step 870) to finalize the activity block. Activity execution block 620 in turn invokes activity block 610A (in step 872), which generates tokens (based on exit conditions for the BpRcv0 activity) for next activity BpScp0, that are added to token pool 630 (step 873). The control is then passed back from activity block 610A to flow control block 660 in step 875.

Flow control block 660 again invokes the activity execution block 620 to check availability of token for BpScp0 activity (in step 880). Since there is a token available for the scope activity and no breakpoints are specified for the scope activity in breakpoint table 640, only steps 859-875 are performed for the subsequent activity. However, in a scenario that a breakpoint is specified for the subsequent activity, steps 830-875 are performed for the subsequent activity. Execution continues until the next breakpoint BpFlw0 (entry 722) is reached and then displaying the interface of FIG. 5F.

It may be appreciated that the above described debugging operation performed by BPEL execution engine 350 results in the time line shown for service request 262 in FIG. 2B, with the entry into debug mode at time points 280 and 290 respectively corresponding to the breakpoints specified for the activities "BpRcv0" and "BpFlw0" as shown in FIG. 7A. The entry into normal mode at time points 282 and 292 is performed in response to a resume operation performed by the User.

Thus, for the specific activities indicated by the user, execution is paused as described above. The user may inspect any internal state of interest for debugging purposes. As described above, a user may also invoke single step debugging mode (via Single-Step button 553) and the manner in which such a feature is supported, is described below with examples.

10. Single Step Debugging

Single-Step table 650, provided according to an aspect of the present invention, maintains information related to the activities on which User performs a single-step operation. Single-Step table 650 stores entries identifying the activities on which a single step is to be performed.

Each of FIGS. 9A-9C depicts the content of Single-Step table 650 at different time instances in one embodiment. The table is shown containing column 911 "ActivityId" indicating the activity identifier, column 912 "Activity Name" indicating the name of the activity (as specified in FIG. 4), and column 913 "State" indicating the state for each entry. Thus, upon completion of an activity listed in table 650 and before performing a subsequent activity, execution is to be paused. It is noted that the BPEL execution engine 350 may operate only based on the activity identifier, and the activity name is optional and included in breakpoint table 640 for clarity. As described below, such effect is obtained by dynamically determining the next activity, and inserting an entry into breakpoint table 640 with the identifier of this next activity.

Figure 10:
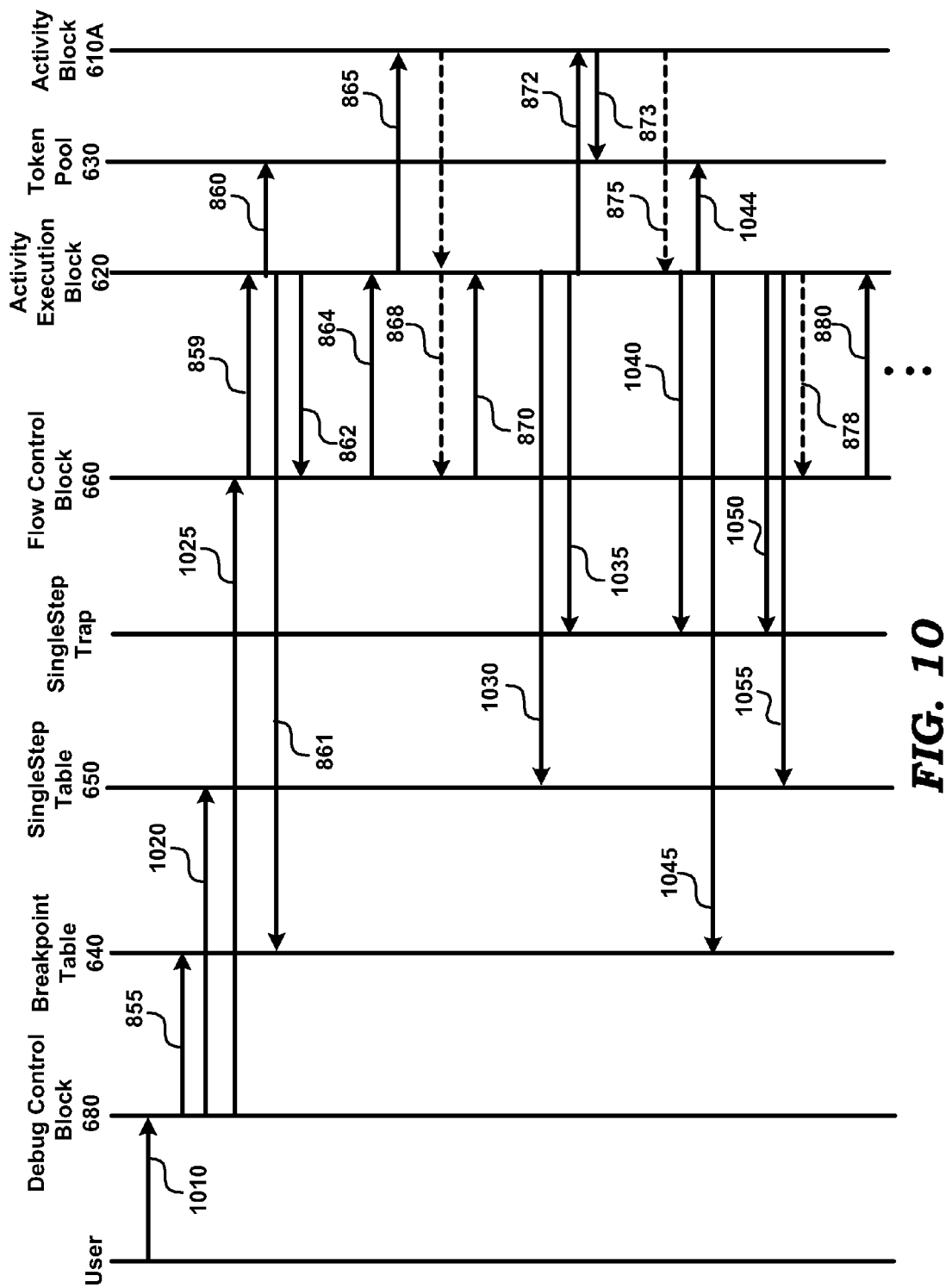
FIG. 10 is a sequence diagram illustrating the manner of facilitating single step debugging in a flow engine in one embodiment.

FIG. 10 is a sequence diagram illustrating the manner of facilitating single step debugging in one embodiment. Similar numbers as in FIG. 8 operate similarly and are not described again for conciseness.

It is assumed that step 1010 starts after step 845 of FIG. 8 (where debug control block 680 is waiting for user input) and that a single step operation using SingleStep button 553 is performed in step 1010. In response, the debug control block 680, in addition to performing step 855 (disabling the breakpoint for BpRcv0 activity), inserts the identifier BpRcv0 of the current activity in single step table 650 (in step 1020), as shown as entry 921 in FIG. 9A. A resume operation is then sent to flow control block 660 in step 1025, and execution is continued till activity block 610A successfully completes and control returns to flow control block 660 (step 868).

In response to invocation of the finalize activity block call from flow control block 660 (step 870), activity execution block 620 first checks (step 1030) whether the currently completed activity (BpRcv0) is present in single step table 650. On identifying that there is a match (entry 921), activity execution block 620 sets (step 1035) a flag (single step trap) to enabled state and then invokes activity block 610A (step 872) to generate tokens that are added to token pool 630 (step 873). Control is then passed from activity block 610A to activity execution block 620 in step 875.

Activity execution block 620 intercepts the return of control from activity block 610A to flow control block 660 (step 875), and checks the state of the single-step trap flag (1040). If the trap flag is inactive or if there is no single-step entry, control returns to flow control block 660 as shown in FIG. 8. Since the trap flag is enabled, it inserts an (internal) breakpoint for each activity for which a token has been generated (by checking for presence in token pool 630 in step 1044) into breakpoint table 640 (step 1045) and resets the single-step trap flag (step 1050) by removing the entry in single-step table 650 (step 1055), before returning control (step 878) to flow control block 660.

Thus, for the above example, activity execution block 620 inserts a breakpoint for activity BpScp0 (for which the token was generated in step 873) of type "internal", as depicted in entry 744 of FIG. 7D. It may be observed that state of breakpoint for current activity BpRcv0 is shown as closed. Furthermore, the removal of the entry for the BpRcv0 activity from single step table 650 is depicted in FIG. 9B, after step 1055. Flow control block 660 continues execution by invoking activity execution block 620 to check availability of token for BpScp0 activity (step 880) as described above.

It may be appreciated that activity execution block 620 would pause execution before performing the scope activity due to entry 744 and display the interface of FIG. 5E, thereby causing the desired single step debug operation to complete. It may be further noted that the breakpoint is affected in course of the single step operation, and not due to breakpoints explicitly specified by the user.

Assuming the user performs Step-Block operation over the Scope activity, the entry for the scope activity is removed as shown in row 764 of FIG. 7E. Since there is already a user specified explicit breakpoint (as shown in row 762) on the next activity (BpFlw0), the single-step operation does not need to add the internal/dynamic breakpoint.

Thus, according to an aspect of the present invention, breakpoint 744 is identified (i.e., the activity identifiers) and inserted 'just-in-time' (in breakpoint table 640) to enable pausing execution on the next activity. Such breakpoints are referred to as dynamic breakpoints. The dynamic breakpoint implementation involving interception of tokens on the fly and insertion of breakpoints 'just-in-time' provides the single-step operation, described above.

It should be appreciated that the dynamic breakpoint based single-step implementation works even when single-step on an activity throws a fault, wherein the next activity will be an activity in the Fault Handler instead of the logical next activity following the activity that generated the fault. Similarly, such an implementation also works on a Flow activity, wherein multiple next activities (the first activity on each on the parallel branches in the Flow activity) are performed.

It may be further appreciated that the above described single step operation of BPEL execution engine 350 results in the time line shown for service request 264 in FIG. 2, with the entry into debug mode at time point 284 (for activity "BpRcv0") caused due to the breakpoint specified in entry 721 of FIG. 7A, and the entry in debug mode at time point 288 (for activity "BPScp0") caused due to the dynamic breakpoint (entry 741) inserted in breakpoint table 640, in response to a user specifying a single step operation. The entry in debug mode at time point 292 (for activity "BPFlw0") is caused due to the breakpoint specified in entry 722 of FIG. 7A.

Thus, a flow engine (BPEL execution engine 350, as a part of the run time environment shared by all business flows) is extended to support debugging (and in particular single step debugging) of business flows executing in a production server. By incorporating the debugging mechanism in the flow engine, the performance of business flows on the production server may not be affected (at least significantly), since the instances executing service requests need no change to support debugging at runtime.

In addition, a business flow may be debugged in a single step operation without having to modify the source/compiled form of the business flow and/or requiring the developer of the business flow to incorporate specific debugging instructions (such as logging instructions to log the internal states during execution) in the business flow. Thus, for example, assuming that business flows are already present in compiled form and a flow engine in accordance with an aspect of the present invention is later employed, the pre-existing business-flows (in compiled form) can be used with the debug features described above (without requiring any changes to the compiled form).

Furthermore, in view of the techniques described above with respect to the run-time environment, it may be appreciated that the same sequence of methods/classes (generally referred to as procedures) in the compiled form of the activity block (business flow) are executed, irrespective of whether processing of a service request enters debug mode or not. In particular, in the embodiments of above, the token withholding logic is implemented in the run-time environment (external to the code representing the business flow) and thus the sequence of procedures executed within each activity block would be the same whether a break point is encountered or not.

It should be appreciated that the features described above can be implemented in various embodiments as a desired combination of one or more of hardware, executable modules, and firmware. The description is continued with respect to an embodiment in which various features are operative when the software instructions described above are executed.

11. Digital Processing System

Figure 11:
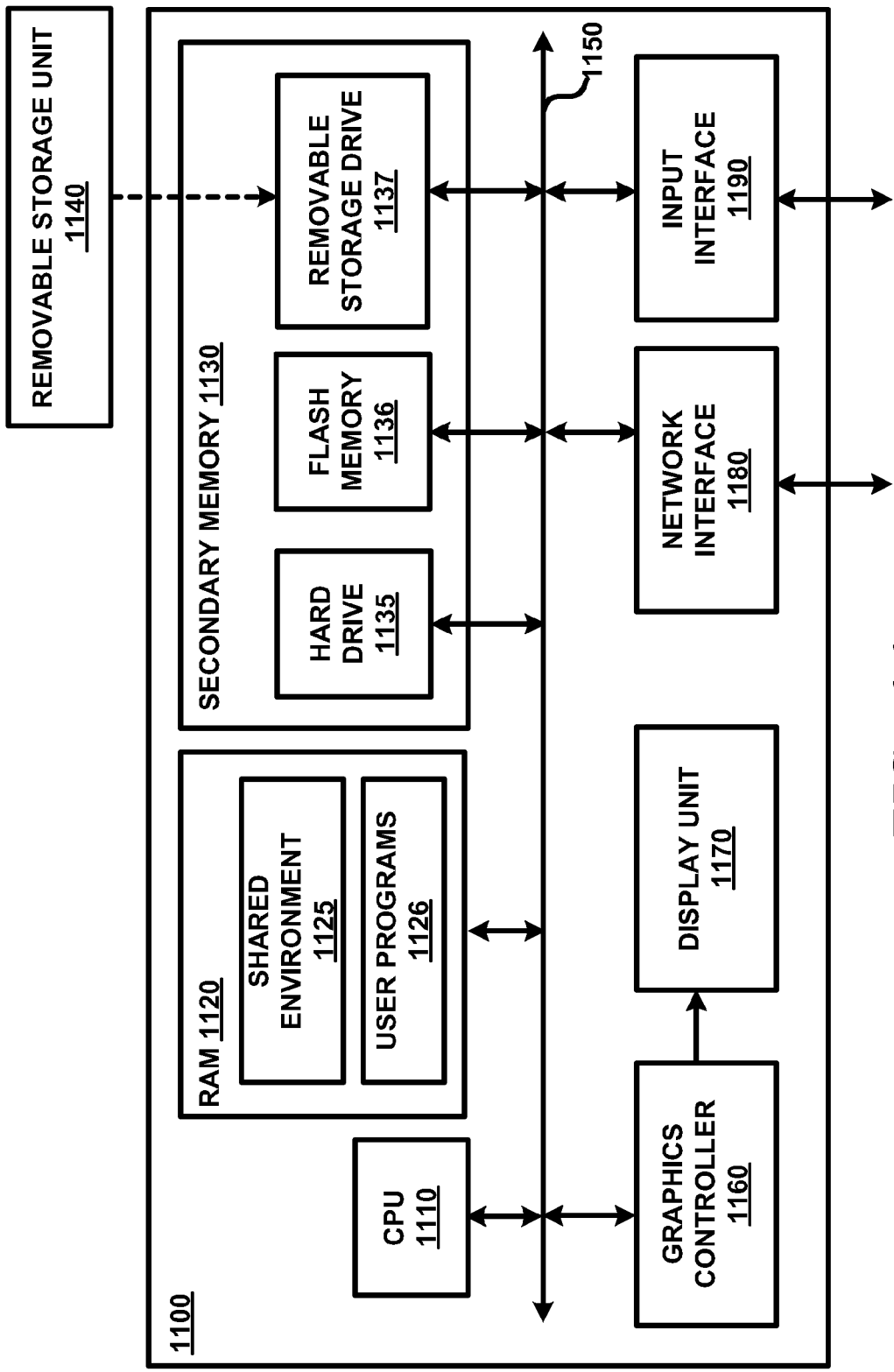
FIG. 11 is a block diagram illustrating the details of a digital processing system in which various aspects of the present invention are operative by execution of appropriate software instructions in one embodiment.

FIG. 11 is a block diagram illustrating the details of digital processing system 1100 in which various aspects of the present invention are operative by execution of appropriate software instructions. Digital processing system 1100 corresponds to production server 150.

Digital processing system 1100 may contain one or more processors (such as a central processing unit (CPU) 1110), random access memory (RAM) 1120, secondary memory 1130, graphics controller 1160, display unit 1170, network interface 1180, and input interface 1190. All the components except display unit 1170 may communicate with each other over communication path 1150, which may contain several buses as is well known in the relevant arts. The components of FIG. 11 are described below in further detail.

CPU 1110 may execute instructions stored in RAM 1120 to provide several features of the present invention. CPU 1110 may contain multiple processing units, with each processing unit potentially being designed for a specific task. Alternatively, CPU 1110 may contain only a single general-purpose processing unit.

RAM 1120 may receive instructions from secondary memory 1130 using communication path 1150. RAM 1120 is shown currently containing software instructions constituting shared environment 1125 and/or user programs 1126 (such as business flows, etc.). Shared environment 1125 contains utilities shared by user programs, and such shared utilities include operating system, device drivers, virtual machines, flow engine, etc., which provide a (common) run time environment for execution of user programs/applications.

Graphics controller 1160 generates display signals (e.g., in RGB format) to display unit 1170 based on data/instructions received from CPU 1110. Display unit 1170 contains a display screen to display the images (e.g., the screens of FIGS. 5A-5H) defined by the display signals. Input interface 1190 may correspond to a keyboard and a pointing device (e.g., touch-pad, mouse) and may be used to provide the user inputs (such as the single step indication, resume indication, etc.) required for several aspects of the present invention.

Network interface 1180 provides connectivity to a network (e.g., using Internet Protocol), and may be used to communicate with other connected systems (such as client systems 110A-110C, developer system 170, server systems 190A-190C) of FIG. 1.

Secondary memory 1130 may contain hard drive 1135, flash memory 1136, and removable storage drive 1137. Secondary memory 1130 may store the data (for example, data indicating which of the business flows/instances are currently being debugged, the debugging state of the business flows/instances) and software instructions (for example, portions of the BPEL instructions shown in Appendix A, corresponding compiled instructions, code constituting the flow engine, etc.), which enable digital processing system 1100 to provide several features in accordance with the present invention.

Some or all of the data and instructions may be provided on removable storage unit 1140, and the data and instructions may be read and provided by removable storage drive 1137 to CPU 1110. Floppy drive, magnetic tape drive, CD-ROM drive, DVD Drive, Flash memory, removable memory chip (PCMCIA Card, EPROM) are examples of such removable storage drive 1137.

Removable storage unit 1140 may be implemented using medium and storage format compatible with removable storage drive 1137 such that removable storage drive 1137 can read the data and instructions. Thus, removable storage unit 1140 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 1140 or hard disk installed in hard drive 1135. These computer program products are means for providing software to digital processing system 1100. CPU 1110 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

APPENDIX A

```
<xml version = "1.0" encoding = "UTF-8" ?>
<process name="HomeLoanProcessing"
targetNamespace="http://xmlns oracle.com/HomeLoanProcessing"
xmlns="http://schemas.xmlsoap.org/ws/2003/03/business-process/"
   ......
xmlns.bpelx="http://schemas.oracle.com/bpel/extension">
<!--
PARTNERLINKS
List of services participating in this BPEL process
-->
<partnerLinks>
<partnerLink name="client" partnerLinkType=
"client:HomeLoanProcessing" myRole="LoanProvider"
partnerRole="HomeLoanRequester"/>
<partnerLink name="CreditRatingService"
partnerLinkType="ns1:CreditRatingService"
partnerRole="CreditRatingServiceProvider"/>
<partnerLink myRole="Bank1LoanServiceRequestor" name=
"Bank1LoanService" partnerRole="Bank1LoanServiceProvider"
partnerLinkType="ns3:Bank1LoanService"/>
<partnerLink myRole="Bank2LoanServiceRequester" name=
"Bank2LoanService" partnerRole="Bank2LoanServiceProvider"
partnerLinkType="ns5:Bank2LoanService"/>
</partnerLinks>
<!--
VARIABLES
List of messages and XML documents used within this BPEL process
-->
<variables>
<!-- Reference to the message passed as input during initiation -->
<variable name="inputVariable"
messageType="client:HomeLoanRequestMessage"/>
<!-- Reference to the message that will be sent back to the requester
during callback -->
<variable name="outputVariable"
messageType="client:HomeLoanResponseMessage"/>
<variable name="invokeCR_process_InputVariable"
messageType="ns1:CreditRatingServiceRequestMessage"/>
<variable name="invokeCR_process_OutputVariable"
messageType="ns1:CreditRatingServiceResponseMessage"/>
<variable name="invokeRD_initiate_InputVariable"
messageType="ns3:Bank1 LoansRequestMessage"/>
<variable name="receiveRD_onResult_InputVariable"
messageType="ns3:Bank1 LoansResponseMessage"/>
<variable name="invokeSM_initiate_InputVariable"
messageType="ns5:Bank2LoanRequestMessage"/>
<variable name="receiveSM_onResult_InputVariable"
messageType="ns5:Bank2LoanResponseMessage"/>
</variables>
<!--
ORCHESTRATION LOGIC
Activities coordinating the flow of messages across the services in this
business process
-->
<sequence name="main">
<!-- Receive input from requestor. -->
<receive name="receiveLoanRequest" partnerLink="client"
portType="client:OrderBooking" operation="initiate"
variable="inputVariable" createInstance="yes"/>
<!-- Asynchronous callback to the requester. -->
<scope name="GetCreditRating">
<faultHandlers>
<catchAll>
<assign name="assignZeroCR">
<copy>
<from expression="'0'"/>
```

APPENDIX A-continued

```
<to variable="invokeCR_process_OutputVariable"
part="payload" query="/ns1:rating"/>
</copy>
<copy>
<from expression="'Bad Credit, Rating = 0'">
<to variable="inputVariable" part="payload"
query="/ns4:HomeLoan/ns4:LoanInfo/ns4:LoanComments"/>
</copy>
</assign>
</catchAll>
</faultHandlers>
<sequence name="Sequence_1">
<assign name="assignCustomerId">
<copy>
<from variable="inputVariable" part="payload"
query="/ns4:HomeLoan/ns4:CustID"/>
<to variable="invokeCR_process_InputVariable"
part="payload" query="/ns1:ssn"/>
</copy>
</assign>
<invoke name="invokeCRService" partnerLink="CreditRatingService"
portType="ns1:CreditRatingService" operation="process"
inputVariable="invokeCR_process_InputVariable"
outputVariable="invokeCR_process_OutputVariable"/>
<assign name="assignCreditRating">
<copy>
<from expression="concat('Good credit, Rating =',bpws:getVariableData(
        'invokeCR_process_OutputVariable','payload','/ns1:rating'))"/>
<to variable="inputVariable" part="payload"
query="/ns4:HomeLoan/ns4:LoanInfo/ns4:LoanComments"/>
</copy>
</assign>
</sequence>
</scope>
<flow name="GetLoanQuotes">
<sequence name="Sequence_2">
<assign name="assignBank1LoanInp">
<copy>
<Flow xmlns="http://xmlns.acme.com/processmodel"/>
<from variable="inputVariable" part="payload"
query="/ns4:HomeLoan/ns4:OrderItems"/>
<to variable="invokeRD_initiate_InputVariable"
part="payload" query="/ns2:OrderItems"/>
</copy>
</assign>
<invoke name="invokeBank1LoanService"
partnerLink="Bank1LoanService"
portType="ns3:Bank1Loans" operation="initiate"
inputVariable="invokeRD_initiate_InputVariable"/>
<receive name="receiveBank1LoanOffer"
partnerLink="Bank1LoanService"
portType="ns3:Bank1LoansCallback" operation="onResult"
variable="receiveRD_onResult_InputVariable" createInstance="no"/>
</sequence>
<sequence name="Sequence_2">
<assign name="assignBank2LoanInp">
<copy>
<from variable="inputVariable" part="payload"
query="/ns4:HomeLoan/ns4:OrderItems"/>
<to variable="invokeSM_initiate_InputVariable"
part="payload" query="/ns2:OrderItems"/>
</copy>
</assign>
<invoke name="invoke Bank2LoanService"
partnerLink=" Bank2LoanService"
portType="ns5: Bank2Loan" operation="initiate"
inputVariable="invokeSM_initiate_InputVariable"/>
<receive name="receive Bank2LoanOffer"
partnerLink=" Bank2LoanService"
portType="ns5: Bank2LoanCallback" operation="onResult"
variable="receiveSM_onResult_InputVariable" createInstance="no"/>
</sequence>
</flow>
<switch name="SelectProvider">
<case condition="bpws:getVariableData
        ('receiveRD_nResult_InputVariable', 'payload',
        '/ns2:ProviderInfo/ns2:ProviderRate') < bpws:getVariableData
        ('receiveSM_onResult_InputVariable','payload',
        '/ns2:ProviderInfo/ns2:ProviderRate') ">
```

APPENDIX A-continued

```
<bpelx:annotation>
<bpelx:pattern>'Is Bank1LoanOffer better than Bank2LoanOffer?'
</bpelx:pattern>
</bpelx:annotation>
<assign name="select Bank1LoanOffer">
<copy>
<from expression="concat(bpws:getVariableData('inputVariable',
    'payload','/ns4:HomeLoan/ns4:LoanInfo/ns4:LoanComments'),
    ' - Selected: Bank1Loan')"/>
<to variable="inputVariable" part="payload"
query="/ns4:HomeLoan/ns4:LoanInfo/ns4:LoanComments"/>
</copy>
<copy>
<from variable="receiveRD_onResult_InputVariable"
part="payload"
query="/ns2:ProviderInfo/ns2:ProviderRate"/>
<to variable="inputVariable" part="payload"
query="/ns4:HomeLoan/ns4:ProviderInfo/ns4:ProviderRate"/>
</copy>
<copy>
<from variable="receiveRD_onResult_InputVariable"
part="payload"
query="/ns2:ProviderInfo/ns2:ProviderName"/>
<to variable="inputVariable" part="payload"
query="/ns4:HomeLoan/ns4:ProviderInfo/ns4:ProviderName"/>
</copy>
</assign>
</case>
<otherwise>
<assign name="select Bank2LoanOffer">
<copy>
<from expression="concat(bpws:getVariableData('inputVariable',
    'payload','/ns4:HomeLoan/ns4:LoanInfo/ns4:LoanComments'),
    ' - Selected: Bank2Loan')"/>
<to variable="inputVariable" part="payload"
query="/ns4:HomeLoan/ns4:LoanInfo/ns4:LoanComments"/>
</copy>
<copy>
<from variable="receiveSM_onResult_InputVariable"
part="payload"
query="/ns2:ProviderInfo/ns2:ProviderRate"/>
<to variable="inputVariable" part="payload"
query="/ns4:HomeLoan/ns4:ProviderInfo/ns4:ProviderRate"/>
</copy>
<copy>
<from variable="receiveSM_onResult_InputVariable"
part="payload"
query="/ns2:ProviderInfo/ns2:ProviderName"/>
<to variable="inputVariable" part="payload"
query="/ns4:HomeLoan/ns4:ProviderInfo/ns4:ProviderName"/>
</copy>
</assign>
</otherwise>
</switch>
<assign name="assignLoanResponse">
<copy>
<from variable="inputVariable" part="payload"/>
<to variable="outputVariable" part="payload"/>
</copy>
</assign>
<invoke name="callbackClient" partnerLink="client"
portType="client:HomeLoanProcessingCallback" operation="onResult"
inputVariable="outputVariable"/>
</sequence>
</process>
```

What is claimed is:

1. A method of processing service requests according to a business flow deployed on a production server, said method being performed in said production server, said method comprising:

receiving a first service request and a second service request to be processed according to said business flow;

receive data representing a set of break points associated with said second service request, each break point corresponding to one of a plurality of activities defining said business flow;

processing concurrently said first service request in a normal mode and said second service request in a debug mode according to said business flow in said production server, wherein a set of activities are performed according to an execution flow while processing said second service request in said debug mode, wherein a control block in said production server monitors said execution flow and pauses said execution flow to transfer control to said control block at each of the activities corresponding to said set of break points, wherein execution is resumed after each pause only upon receiving a user input, wherein said execution flow of processing of said second service request is not paused and control is not transferred to said control block at the remaining ones of said set of activities that do not correspond to any of said set of breakpoints.

2. The method of claim 1, wherein said debug mode supports a single step debug operation, wherein each step corresponds to a single activity of said business flow.

3. The method of claim 2, wherein said first service request is processed using a first instance of said business flow in said normal mode and said second service request is processed using a second instance of said business flow in said debug mode.

4. The method of claim 3, further comprising:

specifying, by said user, a breakpoint at a first activity in said business flow;

creating said second instance upon receiving said second service request;

maintaining a second data structure indicating a second set of breakpoints for said second instance, wherein said breakpoint is included in said second set of breakpoints;

examining, before performing an activity, said second data structure for presence of a corresponding breakpoint identifying said activity; and entering said debug mode for said second service request at said activity if the corresponding breakpoint identifying said activity is present in said second data structure, whereby said second instance enters said debug mode at said first activity.

5. The method of claim 4, wherein the data forming said first service request and said second service request are received from an external client system.

6. The method of claim 2, wherein said business flow comprises a plurality of activities, wherein said processing in said single step debug operation comprises:

pausing before execution of each activity in an execution path; and waiting for a user input to continue execution of the paused activity in said execution path.

7. The method of claim 6, wherein each of said activities is either a basic activity or a compound activity, wherein said compound activity comprises multiple basic activities, said method further comprising:

receiving a second user input indicating whether a step is to equal entire compound activity or each basic activity in the compound activity; and if said second user input indicates that the step equals each basic activity, performing said pausing before execution of each basic activity in a compound activity when processing said second service request according to said business flow, if said second user input indicates that the step equals entire compound activity, performing all the basic activities contained in the compound activity, and then only performing said pausing.

8. The method of claim 2, wherein said business flow is specified according to web service business process execution language (BPEL).

9. The method of claim 3, further comprising:
generating a plurality of activity blocks containing the program logic to perform a plurality of activities forming said business flow; and
executing said plurality of activity blocks concurrently as said first instance in said normal mode and as said second instance in said debug mode,
wherein said plurality of activity blocks contain no additional instructions for facilitating execution in said debug mode.

10. A non-transitory machine readable storage medium storing one or more sequences of instructions for causing a production server to facilitate processing of service requests according to a business flow deployed on said production server, said business flow comprising a plurality of activities, said one of more sequences of instructions comprising:
a first set of instructions representing a plurality of activity blocks, each activity block contains program logic to perform one of said plurality of activities in said business flow; and
a second set of instructions representing an activity execution block to execute said plurality of activity blocks to process a service request,
each of said plurality of activity blocks to generate a token indicating a next activity which is to be performed, wherein each of said plurality of activity blocks is designed to execute the corresponding program logic to perform corresponding activity only upon availability of a corresponding token from said activity execution block,
said activity execution block to withhold availability of said token for said next activity until reception of a continue indication from a user if a breakpoint is specified for said next activity, and to make available said token for said next activity otherwise.

11. The non-transitory machine readable storage medium of claim 10, wherein said production server further comprises a breakpoint table to store a set of breakpoints, each breakpoint specifying the identifier of a corresponding one of a set of activities at which the execution of said business flow is required to be paused, said set of activities being contained in said plurality of activities,
wherein said activity execution block withholds availability of said token for said next activity if the identifier of said next activity matches the identifier of one of said set of activities stored in said breakpoint table, and to make available said token for said next activity if there is no match.

12. The non-transitory machine readable storage medium of claim 11, wherein a corresponding breakpoint table is maintained for each instance of said business flow processing a corresponding service request,
wherein the breakpoint table corresponding to a first instance is empty, whereby said first instance processes a first service request without entering a debug mode,
wherein the breakpoint table corresponding to a second instance stores the identifier of at least one activity, whereby said second instance enters said debug mode while processing a second service request.

13. The non-transitory machine readable storage medium of claim 12, wherein said first service request is processed concurrent with said second service request when said second instance is in said debug mode.

14. The non-transitory machine readable storage medium of claim 11, wherein said one or more sequences of instructions further comprising a third set of instructions representing a debug control block, said debug control block to receive identifier of each activity at which the execution of said business flow is required to be paused, and to store said identifier as one of the identifiers in said breakpoint table.

15. The non-transitory machine readable storage medium of claim 14, wherein said debug control block is further designed to receive said continue indication from said user and to remove the identifier of said next activity in said breakpoint table to cause said activity execution block to make available said token for said next activity, thereby causing continuation of execution of said business flow from said next activity.

16. The non-transitory machine readable storage medium of claim 15, said debug control block is further designed to check whether said continue indication is a single-step indication, if said continue indication is said single-step indication, said debug control block to add the identifier of said next activity to a single step table,
on completion of execution of said next activity by a next activity block, said activity execution block to determine whether the identifier for said next activity is in said single step table and a second token for a subsequent activity is generated by said next activity block, wherein subsequent activity is to be executed following said next activity,
if said identifier for said next activity is determined to be in said single step table and said second token for said subsequent activity is generated by said next activity block, said activity execution block further designed to insert the identifier of said subsequent activity in said breakpoint table such that said activity execution block withholds availability of said second token for said subsequent activity until reception of a corresponding continue indication,
whereby said business flow is executed in a single step debug operation.

17. The non-transitory machine readable storage medium of claim 10, wherein said activity execution block is a part of a run-time environment shared for execution of multiple business flows deployed in said production server,
wherein processing of said service request enters a debug mode upon encountering said breakpoint in an execution path,
wherein a sequence of procedures executed within each of said activity blocks is the same, whether processing of said service request enters said debug mode or not.

18. A production server facilitating debugging of a business flow executing in said production server, said business flow defined using a plurality of activities, said production server comprising:
a processor;
a random access memory (RAM); and
a machine readable medium storing a plurality of instructions, which when retrieved into said RAM and executed by said processor causes said production server to process a second service request in a debug mode according to said business flow in said production server, said plurality of instructions comprising:
a first set of instructions representing a logic for performing each of said plurality of activities;

a second set of instructions to receive data representing said business flow and to generate a third set of instructions designed to invoke said first set of instructions to perform each of a set of activities according to an execution flow while processing said second service request in said debug mode, said set of activities being contained in said plurality of activities and representing said business flow;

a fourth set of instructions representing a control block, said control block to receive data representing a set of break points, each break point corresponding to one of said set of activities in said execution flow, wherein said control block monitors said execution flow and pauses said execution flow to transfer control to said control block at each of the activities corresponding to said set of break points, wherein said execution flow of processing of said second service request is not paused and control is not transferred to said control block at the remaining ones of said set of activities that do not correspond to any of said set of breakpoints.

19. The production server of claim 18, wherein said second service request is processed in a second instance formed by execution of said third set of instructions, and a first service request is processed in a first instance formed by execution of said third set of instructions, wherein said first instance executes in a normal mode concurrently with said second instance executing in said debug mode.

20. The production server of claim 19, wherein said third set of instructions comprises a set of activity blocks corresponding to said set of activities, wherein each of said set of activity blocks, upon execution, generates a token indicating a next activity which is to be performed, wherein each of said set of activity blocks performs corresponding activity only upon availability of a corresponding token, wherein said control block comprises a debug control block and an activity execution block, wherein said debug control block receives said set of breakpoints and stores the received breakpoints in a breakpoint table, wherein said activity execution withholds availability of the token for a next activity until reception of a continue indication from a user if a breakpoint is stored for said next activity in said breakpoint table, and to make available the token for the next activity otherwise.

21. The production server of claim 20, wherein said debug mode supports a single step debug operation, wherein each step corresponds to a single activity of said business flow, wherein said processing of said second service request in said single step debug operation comprises:

pausing before execution of each activity in an execution path; and waiting for a user input to continue execution of the paused activity in said execution path.

22. The production server of claim 21, wherein said pausing is designed to pause before execution of an activity if the corresponding identifier is present in said breakpoint table, wherein each activity upon execution indicates a next activity to be executed in said execution path, said processing of said second service request in said single step debug operation further comprising:

inserting into said breakpoint table, the identifier of said next activity after indication of said next activity, whereby execution is paused before said next activity, thereby executing said business flow in said single step debug operation.

23. A non-transitory machine readable storage medium storing instructions, which when executed by a production server causes the production server to process service requests according to a business flow deployed on a production server, wherein execution of said instructions by one or more processors contained in said production server causes said production server to perform the actions of:

receiving a first service request and a second service request to be processed according to said business flow;

receive data representing a set of break points associated with said second service request, each break point corresponding to one of a plurality of activities defining said business flow;

processing concurrently said first service request in a normal mode and said second service request in a debug mode according to said business flow in said production server, wherein a set of activities are performed according to an execution flow while processing said second service request in said debug mode, wherein a control block in said production server monitors said execution flow and pauses said execution flow to transfer control to said control block at each of the activities corresponding to said set of break points, wherein execution is resumed after each pause only upon receiving a user input, wherein said execution flow of processing of said second service request is not paused and control is not transferred to said control block at the remaining ones of said set of activities that do not correspond to any of said set of breakpoints.

24. The non-transitory storage medium of claim 23, wherein said debug mode supports a single step debug operation, wherein each step corresponds to a single activity of said business flow.

25. The non-transitory storage medium of claim 24, wherein said first service request is processed using a first instance of said business flow in said normal mode and said second service request is processed using a second instance of said business flow in said debug mode.

26. The non-transitory storage medium of claim 25, further comprising:

specifying, by said user, a breakpoint at a first activity in said business flow;

creating said second instance upon receiving said second service request;

maintaining a second data structure indicating a second set of breakpoints for said second instance, wherein said breakpoint is included in said second set of breakpoints;

examining, before performing an activity, said second data structure for presence of a corresponding breakpoint identifying said activity; and entering said debug mode for said second service request at said activity if the corresponding breakpoint identifying said activity is present in said second data structure, whereby said second instance enters said debug mode at said first activity.

27. The non-transitory storage medium of claim 26, wherein the data forming said first service request and said second service request are received from an external client system.

28. The non-transitory storage medium of claim 24, wherein said business flow comprises a plurality of activities, wherein said processing in said single step debug operation comprises:
 pausing before execution of each activity in an execution path; and
 waiting for a user input to continue execution of the paused activity in said execution path.

29. The non-transitory storage medium of claim 28, wherein each of said activities is either a basic activity or a compound activity, wherein said compound activity comprises multiple basic activities, said actions further comprising:
 receiving a second user input indicating whether a step is to equal entire compound activity or each basic activity in the compound activity; and
 if said second user input indicates that the step equals each basic activity, performing said pausing before execution of each basic activity in a compound activity when processing said second service request according to said business flow,
 if said second user input indicates that the step equals entire compound activity, performing all the basic activities contained in the compound activity, and then only performing said pausing.

30. The non-transitory storage medium of claim 24, wherein said business flow is specified according to web service business process execution language (BPEL).

31. The non-transitory storage medium of claim 25, said actions further comprising:
 generating a plurality of activity blocks containing the program logic to perform a plurality of activities forming said business flow; and
 executing said plurality of activity blocks concurrently as said first instance in said normal mode and as said second instance in said debug mode,
 wherein said plurality of activity blocks contain no additional instructions for facilitating execution in said debug mode.

* * * * *

UNITED STATES PATENT AND TRADEMARK OFFICE
CERTIFICATE OF CORRECTION

| | | |
|---|---|---|
| PATENT NO. | : 8,122,292 B2 | |
| APPLICATION NO. | : 12/648310 | |
| DATED | : February 21, 2012 | |
| INVENTOR(S) | : Nanjundaswamy | |

It is certified that error appears in the above-identified patent and that said Letters Patent is hereby corrected as shown below:

In column 13, line 14, delete "("invokeBank1LoanSerice")" and insert -- ("invokeBank1LoanService") --, therefor.

In column 21, line 14, delete "<xml" and insert -- <?xml --, therefor.

In column 21, line 18, delete "xmlns." and insert -- xmlns: --, therefor.

In column 22, line 6, delete "0'">" and insert -- 0'"/> --, therefor.

In column 22, line 65, delete "('receiveRD_nResult_InputVariable'," and insert -- ('receiveRD_onResult_InputVariable', --, therefor.

Signed and Sealed this
Fifteenth Day of May, 2012

David J. Kappos
*Director of the United States Patent and Trademark Office*